United States Patent
Jackson et al.

(10) Patent No.: US 8,005,707 B1
(45) Date of Patent: Aug. 23, 2011

(54) COMPUTER-IMPLEMENTED SYSTEMS AND METHODS FOR DEFINING EVENTS

(75) Inventors: Wilma S. Jackson, Raleigh, NC (US); Michael J. Leonard, Cary, NC (US); David Bruce Elsheimer, Clayton, NC (US)

(73) Assignee: SAS Institute Inc., Cary, NC (US)

( * ) Notice: Subject to any disclaimer, the term of this patent is extended or adjusted under 35 U.S.C. 154(b) by 1276 days.

(21) Appl. No.: 11/431,127

(22) Filed: May 9, 2006

Related U.S. Application Data

(60) Provisional application No. 60/679,093, filed on May 9, 2005.

(51) Int. Cl.
*G06F 19/00* (2006.01)

(52) U.S. Cl. ...... 705/7.29; 705/7.31; 702/179; 702/180; 702/181; 702/189; 703/2; 703/22

(58) Field of Classification Search .................. 705/29, 705/31; 702/179–181, 189; 703/2, 22; 700/29–31
See application file for complete search history.

(56) References Cited

U.S. PATENT DOCUMENTS

| | | | |
|---|---|---|---|
| 5,991,740 A | 11/1999 | Messer | |
| 5,995,943 A | 11/1999 | Bull et al. | |
| 6,052,481 A | 4/2000 | Grajski et al. | |
| 6,128,624 A | 10/2000 | Papierniak et al. | |
| 6,151,584 A | 11/2000 | Papierniak et al. | |
| 6,169,534 B1 | 1/2001 | Raffel et al. | |
| 6,189,029 B1 | 2/2001 | Fuerst | |
| 6,208,975 B1 | 3/2001 | Bull et al. | |
| 6,216,129 B1 | 4/2001 | Eldering | |
| 6,230,064 B1 * | 5/2001 | Nakase et al. | 700/90 |
| 6,286,005 B1 | 9/2001 | Cannon | |
| 6,308,162 B1 | 10/2001 | Ouimet et al. | |
| 6,317,731 B1 | 11/2001 | Luciano | |
| 6,334,110 B1 | 12/2001 | Walter et al. | |
| 6,356,842 B1 * | 3/2002 | Intriligator et al. | 702/3 |
| 6,397,166 B1 | 5/2002 | Leung et al. | |
| 6,400,853 B1 | 6/2002 | Shiiyama | |
| 6,526,405 B1 | 2/2003 | Mannila et al. | |
| 6,539,392 B1 | 3/2003 | Rebane | |
| 6,542,869 B1 | 4/2003 | Foote | |
| 6,564,190 B1 | 5/2003 | Dubner | |
| 6,591,255 B1 | 7/2003 | Tatum et al. | |
| 6,611,726 B1 * | 8/2003 | Crosswhite | 700/99 |
| 6,640,227 B1 | 10/2003 | Andreev | |
| 6,735,738 B1 | 5/2004 | Kojima | |
| 6,775,646 B1 | 8/2004 | Tufillaro et al. | |
| 6,792,399 B1 | 9/2004 | Phillips et al. | |
| 6,850,871 B1 | 2/2005 | Barford et al. | |

(Continued)

OTHER PUBLICATIONS

Susan Garavaglia & Asha Sharma, A Smart Guide to Dummy Variables, accessed from: http://web.archive.org/web/20040728083413/http://www.ats.ucla.edu/stat/sas/library/nesug98/p046.pdf.*

(Continued)

*Primary Examiner* — Beth V Boswell
*Assistant Examiner* — Tiphany B Dickerson
(74) *Attorney, Agent, or Firm* — Jones Day

(57) ABSTRACT

Computer-implemented systems and methods to process time-series data. As an example, a system and method can use a first data store to store time series data, and a second data store to store definitions of events. A dummy variable is generated when data from an event's definition is applied to time series data.

16 Claims, 48 Drawing Sheets

U.S. PATENT DOCUMENTS

| | | | |
|---|---|---|---|
| 6,878,891 | B1 | 4/2005 | Josten et al. |
| 6,928,398 | B1* | 8/2005 | Fang et al. .................. 703/2 |
| 6,978,249 | B1 | 12/2005 | Beyer et al. |
| 7,072,863 | B1 | 7/2006 | Phillips et al. |
| 7,103,222 | B2 | 9/2006 | Peker |
| 7,171,340 | B2 | 1/2007 | Brocklebank |
| 7,194,434 | B2* | 3/2007 | Piccioli .................. 705/36 R |
| 7,216,088 | B1 | 5/2007 | Chappel et al. |
| 7,222,082 | B1* | 5/2007 | Adhikari et al. .................. 705/8 |
| 7,236,940 | B2 | 6/2007 | Chappel |
| 7,251,589 | B1 | 7/2007 | Crowe et al. |
| 7,260,550 | B1 | 8/2007 | Notani |
| 7,280,986 | B2 | 10/2007 | Goldberg et al. |
| 7,433,834 | B2 | 10/2008 | Joao |
| 7,523,048 | B1* | 4/2009 | Dvorak .................. 705/10 |
| 7,530,025 | B2* | 5/2009 | Ramarajan et al. .......... 715/764 |
| 7,565,417 | B2* | 7/2009 | Rowady, Jr. .................. 709/220 |
| 7,570,262 | B2* | 8/2009 | Landau et al. .................. 345/440 |
| 7,610,214 | B1 | 10/2009 | Dwarakanath et al. |
| 7,617,167 | B2* | 11/2009 | Griffis et al. .................. 706/45 |
| 7,702,482 | B2* | 4/2010 | Graepel et al. .................. 702/179 |
| 2002/0169657 | A1* | 11/2002 | Singh et al. .................. 705/10 |
| 2003/0101009 | A1* | 5/2003 | Seem .................. 702/61 |
| 2003/0105660 | A1 | 6/2003 | Walsh et al. |
| 2003/0110016 | A1 | 6/2003 | Stefek et al. |
| 2003/0154144 | A1* | 8/2003 | Pokorny et al. .................. 705/28 |
| 2003/0187719 | A1 | 10/2003 | Brocklebank |
| 2003/0200134 | A1* | 10/2003 | Leonard et al. .................. 705/10 |
| 2004/0172225 | A1 | 9/2004 | Hochberg et al. |
| 2005/0102107 | A1 | 5/2005 | Porikli |
| 2005/0177351 | A1 | 8/2005 | Goldberg et al. |
| 2005/0209732 | A1 | 9/2005 | Audimoolam et al. |
| 2005/0249412 | A1 | 11/2005 | Radhakrishnan et al. |
| 2006/0063156 | A1 | 3/2006 | Willman et al. |
| 2006/0064181 | A1 | 3/2006 | Kato |
| 2006/0855380 | | 4/2006 | Cote et al. |
| 2006/0112028 | A1 | 5/2006 | Xiao et al. |
| 2006/0143081 | A1 | 6/2006 | Argaiz |
| 2006/0241923 | A1 | 10/2006 | Xu et al. |
| 2006/0247900 | A1 | 11/2006 | Brocklebank |
| 2007/0162301 | A1 | 7/2007 | Sussman et al. |
| 2007/0291958 | A1 | 12/2007 | Jehan |
| 2008/0294651 | A1 | 11/2008 | Masuyama et al. |

OTHER PUBLICATIONS

Alex Safavi. "Choosing the right forecasting software and system. " The Journal of Business Forecasting Methods & Systems 19.3 (2000): 6-10. ABI/INFORM Global, ProQuest.*

John B. Guerard Jr. Automatic Time Series Modeling, Intervention Analysis, and Effective Forecasting. (1989) Journal of Statistical Computation and Simulation, 1563-5163, vol. 34, Issue 1, pp. 43-49.*

Seasonal Dummy Variables, Mar. 2004, http://shazam.econ.ubc.ca/intro/dumseas.htm, Accessed from: http://web.archive.org/web/20040321055948/http://shazam.econ.ubc.ca/intro/dumseas.htm.*

Using Predictor Variables, (1999) SAS OnlineDoc: Version 8, pp. 1325-1349, Accessed from: http://www.okstate.edu/sas/v8/saspdf/ets/chap27.pdf.*

Susan Garavaglia & Asha Sharma, A Smart Guide to Dummy Variables, (2004) accessed from: http://web.archive.org/web/20040728083413/http://www.ats.ucla.edu/stat/sas/library/nesug98/p046.pdf.*

Using Predictor Variables, (1999) SAS OnlineDoc: Version 8, pp. 1325-1349, Accessed from: http://www.okstate.edu/sas/v8/saspdf/ets/chap27.pdf.*

John B. Guerard Jr. Automatic Time Series Modeling, Intervention Analysis, and Effective Forecasting. (1989) Journal of Statistical Computation and Simulation, 1563-5163, vol. 34, Issue 1, pp. 43-49.*

Seasonal Dummy Variables, Mar. 2004, http://shazam.econ.ubc.ca/intro/dumseas.htm, Accessed from: http://web.archive.org/web/20040321055948/http://shazam.econ.ubc.ca/intro/dumseas.htm.*

Guralnik, V. and Srivastava, J., Event Detection from Time Series Data (1999), Proceedings of the 5th ACM SIGKDD International Conference on Knowledge Discovery and Data Mining, pp. 33-42.*

Choudhury, J. Paul et al., "Forecasting of Engineering Manpower Through Fuzzy Associative Memory Neural Network with ARIMA: A Comparative Study", Neurocomputing, vol. 47, Iss. 1-4, pp. 241-257 (Aug. 2002).

Harrison, H.C. et al., "An Intelligent Business Forecasting System", ACM Annual Computer Science Conference, pp. 229-236 (1993).

Jacobsen, Erik et al., "Assigning Confidence to Conditional Branch Predictions", IEEE, Proceedings of the 29th Annual International Symposium on Microarchitecture, 12 pp. (Dec. 2-4, 1996).

Keogh, Eamonn J. et al., "Derivative Dynamic Time Warping", In First SIAM International Conference on Data Mining (SDM'2001), Chicago, USA, pp. 1-11 (2001).

Abstract, Kobbacy, Khairy A.H., et al., "Towards the development of an intelligent inventory management system", Integrated Manufacturing Systems, vol. 10, Issue 6, 1999 (11 pp.).

Kumar, Mahesh, "Combining Forecasts Using Clustering", Rutcor Research Report 40-2005, cover page and pp. 1-16 (Dec. 2005).

Leonard, Michael, "Promotional Analysis and Forecasting for Demand Planning: A Practical Time Series Approach", with exhibits 1 and 2, SAS Institute Inc., Cary, North Carolina, 50 pp. (2000).

Leonard, Michael, "Large-Scale Automatic Forecasting: Millions of Forecasts", abstract and presentation, International Symposium of Forecasting, 156 pp. (2002).

Leonard, Michael et al., "Mining Transactional and Time Series Data", abstract and presentation, International Symposium of Forecasting, 23 pp. (2003).

Leonard, Michael, "Large-Scale Automatic Forecasting Using Inputs and Calendar Events", abstract and presentation, International Symposium on Forecasting Conference, 56 pp. (Jul. 4-7, 2004).

Leonard, Michael, "Predictive Modeling Markup Language for Time Series Models", abstract and presentation, International Symposium on Forecasting Conference, 35 pp. (Jul. 4-7, 2004).

Leonard, Michael et al., "Mining Transactional and Time Series Data", abstract, presentation and paper, SUGI, 142 pp. (Apr. 10-13, 2005).

Leonard, Michael, "Large-Scale Automatic Forecasting Using Inputs and Calendar Events", White Paper, pp. 1-27 (2005).

Lu, Sheng et al., "A New Algorithm for Linear and Nonlinear ARMA Model Parameter Estimation Using Affine Geometry", IEEE Transactions on Biomedical Engineering, vol. 48, No. 10, pp. 1116-1124 (Oct. 2001).

Malhotra, Manoj K. et al., "Decision making using multiple models", European Journal of Operational Research, 114, pp. 1-14 (1999).

McQuarrie, Allan D.R. et al., "Regression and Time Series Model Selection", World Scientific Publishing Co. Pte. Ltd., 40 pp. (1998).

Abstract, Park, Kwan Hee, "Development and evaluation of a prototype expert system for forecasting models", Mississippi State University, 1990 (1 pg.).

Abstract, Tashman, Leonard J. et al., "Automatic Forecasting Software: A Survey and Evaluation", International Journal of Forecasting, vol. 7, Issue 2, Aug. 1991 (1 pg.).

van Wijk, Jarke J. et al., "Cluster and Calendar based Visualization of Time Series Data", IEEE Symposium on Information Visualization (INFOVIS '99), San Francisco, pp. 1-6 (Oct. 25-26, 1999).

Wang, Liang et al., "An Expert System for Forecasting Model Selection", IEEE, pp. 704-709 (1992).

Product Brochure, ForecastPRO, 2000 (12 pp.).

Automatic Forecasting Systems Inc., Autobox 5.0 for Windows User's Guide, 82 pp. (1999).

SAS Institute Inc., SAS/ETS User's Guide, Version 8, pp. 577-631 and 1307-1323 (1999).

"Data Mining Group", http://www.dmg.org, printed May 9, 2005, 3 pp.

Crowe, Keith E. et al., U.S. Appl. No. 11/431,089, filed May 9, 2006 entitled "Computer-Implemented System and Method For Generating Forecasts".

Park, Youngjin et al., U.S. Appl. No. 11/431,116, filed May 9. 2006 entitled "Computer-Implemented Systems and Methods For Processing Time Series Data".

Crowe, Keith E. et al., U.S. Appl. No. 11/431,123, filed May 9, 2006 entitled "Computer-Implemented Systems and Methods For Storing Data Analysis Models".

Leonard, Michael James, U.S. Appl. No. 11/696,951, filed Apr. 5, 2007 entitled "Systems and Methods For Mining Transactional and Times Series Data".

Vanderplaats, Garret N., "Numerical Optimization Techniques for Engineering Design", Vanderplaats Research & Development (publisher), Third Edition, 18 pp. (1999).

Oates, Tim et al., "Clustering Time Series with Hidden Markov Models and Dynamic Time Warping", Computer Science Department, LGRC University of Massachusetts, In Proceedings of the IJCAI-99, 5 pp. (1999).

* cited by examiner

| BEFORE= (DURATION=value) | PULSE=value | Definition of $t_b$ |
|---|---|---|
| ALL | N/A | $t_b = 1$, the first observation in the data set |
| | | or $t_b$ = the observation specified by START= |
| m=0 | not specified | $t_b = t_i$ (the observation specified by the timing value) |
| m>0 | not specified | $t_b = t_i - m$ |
| $m \geq 0$ | interval | $t_b$ = the observation specified by the date INTNX( $interval$, timing value, $-m$, 'begin' ) |

| AFTER= (DURATION=value) | PULSE=value | Definition of $t_e$ |
|---|---|---|
| ALL | N/A | $t_e$ = the last observation in the data set |
| | | or $t_e$ = the observation specified by END= |
| n=0 | not specified | $t_e = t_i$, the observation specified by the timing value |
| n>0 | not specified | $t_e = t_i + n$ |
| $n \geq 0$ | interval | $t_e$ = the observation specified by the date INTNX( $interval$, timing value, $n$, 'end' ) |

FIG. 12

| Type | Description | Definition |
|---|---|---|
| POINT | point or pulse | $\xi_{it} = \nu$, for all $t$ |
| LS | level shift | $S_{it} = \nu$, for all $t$ |
| RAMP | ramp | |
| | SLOPE=GROWTH | $\xi_{it} = \nu(t - t_1)$, for all $t$ |
| | SLOPE=DECAY | $\xi_{it} = \nu(t_2 - t)$, for all $t$ |
| | $s_b$ = GROWTH | $\xi_{it} = \nu(t_1 - t)$, if $t \le t_1$ |
| | $s_a$ = DECAY | $\xi_{it} = \nu(t_2 - t)$, if $t_1 \le t$ |
| | $s_b$ = DECAY | $\xi_{it} = \nu(t_1 - t)$, if $t \le t_1$ |
| | $s_a$ = GROWTH | $\xi_{it} = \nu(t - t_1)$, if $t_1 \le t$ |
| TEMPRAMP or TR | temporary ramp | TEMPRAMP is the same as RAMP for infinite cases |
| TC | temporary change | |
| | SLOPE=GROWTH | $\xi_{it} = \nu\phi^{(t-t_1)}$, for all $t$ |
| | SLOPE=DECAY | $\xi_{it} = \nu\phi^{(t-t_1)}$, for all $t$ |
| | $s_b$ = GROWTH | $\xi_{it} = \nu\phi^{(t-t_1)}$, if $t \le t_1$ |
| | $s_a$ = DECAY | $\xi_{it} = \nu\phi^{(t-t_1)}$, if $t_1 \le t$ |

FIG. 13

| | | |
|---|---|---|
| | $s_b$ = DECAY | $\xi_{it} = \nu\phi^{(t-t_i)}$, if $t_i \leq t_2$ |
| | $s_a$ = GROWTH | $\xi_{it} = \nu\phi^{(t_i-t)}$, if $t_i \leq t$ |
| LINEAR or LIN | linear trend | $\xi_{it} = \nu(t - t_i)$, for all $t$ |
| | SLOPE = does not apply | |
| QUAD | quadratic trend | $\xi_{it} = \nu(t - t_i)^2$, for all $t$ |
| | SLOPE = does not apply | |
| CUBIC | cubic trend | $\xi_{it} = \nu(t - t_i)^3$, for all $t$ |
| | SLOPE = does not apply | |

FIG. 14

| Type | Description | Definition |
|---|---|---|
| POINT | point or pulse | $\xi_{it} = \nu$, if $t_b \leq t \leq t_e$ |
| | | $\xi_{it} = $ undefined, otherwise |
| LS | level shift | $\xi_{it} = \nu$, if $t_b \leq t \leq t_e$ |
| | | $\xi_{it} = $ undefined, otherwise |
| RAMP | ramp | |
| | $m = n = 0$ | $\xi_{it} = 0$, if $t = t_i$ |
| | PULSE=$interval \leq$ | $\xi_{it} = $ undefined, otherwise |
| | width of an observation | |
| | $S_b$ = GROWTH | $\xi_{it} = \nu(t - t_b)/(t_e - t_b)$, if $t_b \leq t \leq t_e$ |
| | | $\xi_{it} = \nu$, if $t > t_e$ |
| | | $\xi_{it} = $ undefined, otherwise |
| | $S_b$ = DECAY | $\xi_{it} = \nu$, if $t < t_b$ |
| | | $\xi_{it} = \nu(t_e - t)/(t_e - t_b)$, if $t_b \leq t \leq t_e$ |
| | | $\xi_{it} = $ undefined, otherwise |
| | $S_a$ = GROWTH | $\xi_{it} = \nu(t - t_b)/(t_i - t_b)$, if $t_b \leq t \leq t_i$ |
| | $S_a$ = DECAY | $\xi_{it} = \nu(t_e - t)/(t_e - t_i)$, if $t_i \leq t \leq t_e$ |
| | $m > 0, n > 0$ | $\xi_{it} = $ undefined, otherwise |
| | $S_b$ = DECAY | $\xi_{it} = \nu$, if $t < t_b$ |
| | $S_a$ = GROWTH | $\xi_{it} = \nu(t_i - t)/(t_i - t_b)$, if $t_b \leq t \leq t_i$ |

| | | | |
|---|---|---|---|
| ... | | | |
| | | $m > 0, n > 0$ | $\xi_{it} = \nu(t - t_i)/(t_e - t_i)$, if $t_i \leq t \leq t_e$ |
| | | | $\xi_{it} = \nu$, if $t > t_e$ |
| TEMPRAMP or TR | temporary ramp | | |
| | | $m = n = 0$ | $\xi_{it} = 0$, if $t = t_i$ |
| | | PULSE=interval ≤ width of an observation | $\xi_{it} = $ undefined, otherwise |
| | | SLOPE=GROWTH | $\xi_{it} = \nu(t - t_b)/(t_e - t_b)$, if $t_b \leq t \leq t_e$ |
| | | | $\xi_{it} = $ undefined, otherwise |
| | | SLOPE=DECAY | $\xi_{it} = \nu(t_e - t)/(t_e - t_b)$, if $t_b \leq t \leq t_e$ |
| | | | $\xi_{it} = $ undefined, otherwise |
| | | $s_b = $ GROWTH $s_a = $ DECAY | $\xi_{it} = \nu(t - t_b)/(t_i - t_b)$, if $t_b \leq t \leq t_i$ |
| | | | $\xi_{it} = \nu(t_e - t)/(t_e - t_i)$, if $t_i \leq t \leq t_e$ |
| | | $m > 0, n > 0$ | $\xi_{it} = $ undefined, otherwise |
| | | $s_b = $ DECAY $s_a = $ GROWTH | $\xi_{it} = \nu(t_i - t)/(t_i - t_b)$, if $t_b \leq t \leq t_i$ |
| | | | $\xi_{it} = \nu(t - t_i)/(t_e - t_i)$, if $t_i \leq t \leq t_e$ |
| | | $m > 0, n > 0$ | $\xi_{it} = $ undefined, otherwise |
| TC | temporary change | | |
| | | SLOPE=GROWTH | $\xi_{it} = \nu\phi^{(t_e - t)}$, if $t_b \leq t \leq t_e$ |
| | | | $\xi_{it} = $ undefined, otherwise |
| ... | | | |

FIG. 16

| | | |
|---|---|---|
| | SLOPE=DECAY | $\xi_{it} = \nu\phi^{(t-t_b)}$, if $t_b \leq t \leq t_e$ |
| | | $\xi_{it} =$ undefined, otherwise |
| | $s_b =$ GROWTH | $\xi_{it} = \nu\phi^{(t_i-t)}$, if $t_b \leq t \leq t_i$ |
| | $s_a =$ DECAY | $\xi_{it} = \nu\phi^{(t-t_i)}$, if $t_i \leq t \leq t_e$ |
| | $m > 0, n > 0$ | $\xi_{it} =$ undefined, otherwise |
| | $s_b =$ DECAY | $\xi_{it} = \nu\phi^{((t_e-t_i)+(t-t_i))}$, if $t_b \leq t \leq t_i$ |
| | $s_a =$ GROWTH | $\xi_{it} = \nu\phi^{(t_e-t)}$, if $t_i \leq t \leq t_e$ |
| | $0 < m \leq n$ | $\xi_{it} =$ undefined, otherwise |
| | $s_b =$ DECAY | $\xi_{it} = \nu\phi^{(t-t_b)}$, if $t_b \leq t \leq t_i$ |
| | $s_a =$ GROWTH | $\xi_{it} = \nu\phi^{((t_i-t_b)+(t_i-t))}$, if $t_i \leq t \leq t_e$ |
| | $0 < n \leq m$ | $\xi_{it} =$ undefined, otherwise |
| LINEAR or LIN | linear trend | $\xi_{it} = \nu(t-t_j)$, if $t_b \leq t \leq t_e$ |
| | SLOPE= does not apply | |
| QUAD | quadratic trend | $\xi_{it} = \nu(t-t_j)^2$, if $t_b \leq t \leq t_e$ |
| | SLOPE= does not apply | |
| CUBIC | cubic trend | $\xi_{it} = \nu(t-t_j)^3$, if $t_b \leq t \leq t_e$ |
| | SLOPE= does not apply | |

FIG. 17

```
proc hpfevents data=sashelp.air ;
   var air;
   id date interval=month end='31Dec1952'D;
   eventdef laborday= LABOR / VALUE=2 ;
   eventdef summer= '01Jun1900'D to '01Jun2005'D by year /
                    AFTER=(DURATION=2) LABEL='jun jul aug';
   eventdef yr1950= '01Jan1950'D / PULSE=YEAR ;
   eventdef levelshift= '01Jan1950'D / TYPE=LS ;
   eventdef novdec= CHRISTMAS / BEFORE=(DURATION=1)
                    PULSE=MONTH;
   eventkey first10obs= 1 to 10;
   eventkey everyotherobs= 1 to 200 by 2;
   eventdef saturday= '01Jan1950'D to '31Jan1950'D by WEEK.7;
   eventkey ao15obs;
   eventkey ls01Jan1950D / AFTER=(DURATION=5) ;
   eventkey garbage ;
   eventdata   out= evdsout1 (label='list of events');
   eventdummy  out= evdumout1 (label='dummy variables');
run;
```

FIG. 21

```
proc hpfevents data=sashelp.air ;
   id date interval=month end='31Dec1952'D;
   eventdata in= evdsout1;
   eventdata out= evdsout2 condense;
run;
```

FIG. 24

| Obs | _NAME_ | _KEYNAME_ | _STARTDATE_ | _ENDDATE_ | _DATEINTRVL_ | _STARTOBS_ |
|---|---|---|---|---|---|---|
| 1 | LABORDAY | LABOR | . | . | . | . |
| 2 | SUMMER | . | 01JUN1900 | 01JUN2005 | YEAR.6 | . |
| 3 | YR1950 | . | 01JAN1950 | . | . | . |
| 4 | LEVELSHIFT | . | 01JAN1950 | . | . | . |
| 5 | NOVDEC | CHRISTMAS | . | . | . | . |
| 6 | FIRST100OBS | . | . | . | . | 1 |
| 7 | EVERYOTHEROBS | . | . | . | . | 1 |
| 8 | SATURDAY | . | 07JAN1950 | 28JAN1950 | WEEK1.7 | . |
| 9 | AO15OBS | . | . | . | . | 15 |
| 10 | LS01JAN1950D | . | 01JAN1950 | . | . | . |

| Obs | _ENDOBS_ | _OBSINTRVL_ | _TYPE_ | _VALUE_ | _PULSE_ | _DUR_BEFORE_ | _DUR_AFTER_ |
|---|---|---|---|---|---|---|---|
| 1 | . | . | POINT | 2 | . | 0 | 0 |
| 2 | . | . | POINT | 1 | . | 0 | 2 |
| 3 | . | . | POINT | 1 | YEAR | 0 | 0 |
| 4 | . | . | LS | 1 | . | 0 | A |
| 5 | . | . | POINT | 1 | MONTH | 1 | 0 |
| 6 | 10 | 1 | POINT | 1 | . | 0 | 0 |
| 7 | 199 | 2 | POINT | 1 | . | 0 | 0 |
| 8 | . | . | POINT | 1 | . | 0 | 0 |
| 9 | . | . | POINT | 1 | . | 0 | 5 |
| 10 | . | . | LS | 1 | . | . | . | proc print data=evdsout2;
run;

FIG. 26

| Description | Statement | Option |
|---|---|---|
| Statements | | |
| specify BY-group processing | BY | |
| specify event combination | EVENTCOMB | |
| specify event definition | EVENTDEF | |
| specify group of events | EVENTGROUP | |
| use predefined event definition | EVENTKEY | |
| specify event data set | EVENTDATA | |
| specify dummy data set | EVENTDUMMY | |
| specify the time ID variable | ID | |
| specify variables to be copied to the dummy data set | VAR | |
| Data Set Options | | |
| specify the input data set | PROC HPFEVENTS | DATA= |
| specify an events input data set | EVENTDATA | IN= |
| specify an events output data set | EVENTDATA | OUT= |
| specify that the events output data set will be condensed | EVENTDATA | CONDENSE |
| specify a dummy output data set | EVENTDUMMY | OUT= |
| specify starting time ID value | ID | START= |
| specify ending time ID value | ID | END= |
| Dummy Variable Format Options | | |
| extend dummy variables past end of series | PROC HPFEVENTS | LEAD= |
| specify missing value interpretation | ID | SETMISSING= |
| specify frequency of the dummy variable(s) | ID | INTERVAL= |
| specify interval alignment | ID | ALIGN= |
| Miscellaneous Options | | |
| specify that variables in output data sets are in sorted order | PROC HPFEVENTS | SORTNAMES |
| limit error and warning messages | PROC HPFEVENTS | MAXERROR= |

800 → Statements
802 → Data Set Options
804 → Dummy Variable Format Options
806 → Miscellaneous Options

| Date Keyword | Definition |
|---|---|
| EASTER | Easter Sunday |
| THANKSGIVING | 4th Thursday in November |
| BOXING | December 26th |
| CANADA | July 1st |
| CHRISTMAS | December 25th |
| FATHERS | 3rd Sunday in June |
| HALLOWEEN | October 31st |
| USINDEPENDENCE | July 4th |
| LABOR | 1st Monday in September |
| MEMORIAL | last Monday in May |
| MOTHERS | 2nd Sunday in May |
| NEWYEAR | January 1st |
| THANKSGIVINGCANADA | 2nd Monday in October |
| VALENTINES | February 14th |
| VICTORIA | Monday on or preceding May 24th |
| CANADAOBSERVED | July 1st, or July 2nd, if July 1st is a Sunday |

FIG. 27

| Date Keyword | Definition |
|---|---|
| SECOND_1,... SECOND_60 | The specified second. |
| MINUTE_1,... MINUTE_60 | The beginning of the specified minute. |
| HOUR_1,... HOUR_24 | The beginning of the specified hour. |
| SUNDAY,... SATURDAY | All SUNDAYs, etc. in the time series. |
| WEEK_1,... WEEK_53 | The first day of the nth week of the year. PULSE=WEEK.n will shift this date for $n \neq 1$. |
| TENDAY_1,... TENDAY_36 | The 1st, 11th, or 21st of the appropriate month. |
| SEMIMONTH_1,... SEMIMONTH_24 | The 1st or 16th of the appropriate month. |
| JANUARY,... DECEMBER | The 1st of the specified month. |
| QTR_1, QTR_2, QTR_3, QTR_4 | The first date of the quarter. PULSE=QTR.n will shift this date for $n \neq 1$. |
| SEMIYEAR_1, SEMIYEAR_2 | The first date of the semiyear. PULSE=SEMIYEAR.n shifts this date for $n \neq 1$. |

FIG. 28

| | AFTER= (DURATION=) Default | Default Shape | Shape when finite AFTER= duration > 0 |
|---|---|---|---|
| Non-trend TYPE= (BEFORE= Default is 0) | | | |
| TYPE=INV or INVERSE | default is ALL (or end of series) | | |
| TYPE=LOG or LOGARITHMIC | default is ALL (or end of series) | | |
| Trend TYPE= | BEFORE= and AFTER= (DURATION=) Default | Default Shape | Shape when finite BEFORE= and AFTER= duration > 0 |
| TYPE=LINEAR TYPE=LIN | default is ALL (or entire series) | | |
| TYPE=QUAD | default is ALL (or entire series) | | |
| TYPE=CUBIC | default is ALL (or entire series) | | |

FIG. 30

| RULE | Name | Definition |
|---|---|---|
| ADD | Add | Add the values. |
| MAX | Maximum | Use the maximum value. |
| MIN | Minimum | Use the minimum value. |
| MINNZ | Minimum Nonzero | Use the minimum nonzero value. |
| MINMAG | Minimum Magnitude | Use the value whose magnitude is the least. |

FIG. 31

| Variable Name or Variable Name Format | Description | Qualifier Options |
|---|---|---|
| AO<obs>OBS<br>AO<date>D<br>AO<datetime>DT | Outlier | TYPE=POINT VALUE=1<br>BEFORE=(DURATION=0)<br>AFTER=(DURATION=0) |
| LS<obs>OBS<br>LS<date>D<br>LS<datetime>DT | Level Shift | TYPE=LS VALUE=1<br>BEFORE=(DURATION=0)<br>AFTER=(DURATION=ALL) |
| <date keyword> | Date Pulse | TYPE=POINT VALUE=1<br>BEFORE=(DURATION=0)<br>AFTER=(DURATION=0)<br>PULSE=DAY |
| LINEAR<br>QUAD<br>CUBIC | Polynomial Trends | TYPE=LIN<br>TYPE=QUAD<br>TYPE=CUBIC<br>VALUE=1 BEFORE=(DURATION=ALL)<br>AFTER=(DURATION=ALL)<br>default timing value is 0 observation |
| INVERSE<br>LOG | Trends | TYPE=INV<br>TYPE=LOG<br>VALUE=1 BEFORE=(DURATION=ALL)<br>AFTER=(DURATION=ALL)<br>default timing value is 0 observation |
| <seasonal keywords> | Seasonal | TYPE=POINT<br>PULSE= depends on keyword<br>VALUE=1 BEFORE=(DURATION=0)<br>AFTER=(DURATION=0)<br>timing values based on keyword |

FIG. 32

| Variable Name Format | Example | Refers to |
|---|---|---|
| AO<int>OBS | AO15OBS | 15th observation |
| AO<date>D | AO01JAN2000D | '01JAN2000'D |
| AO<date>h<hr>m<min>s<sec>DT | AO01Jan2000h12m34s56DT | '01Jan2000:12:34:56'DT |
| LS<int>OBS | LS15OBS | 15th observation |
| LS<date>D | LS01JAN2000D | '01JAN2000'D |
| LS<date>h<hr>m<min>s<sec>DT | LS01Jan2000h12m34s56DT | '01Jan2000:12:34:56'DT |

FIG. 33

| Variable Name | Description | Associated Event Keywords |
|---|---|---|
| Seasonal | Seasonal | Depending on ID statement |
| SECONDS | Seasonal | SECOND_1,... SECOND_60 or |
| MINUTES | Seasonal | MINUTE_1,... MINUTE_60 or |
| HOURS | Seasonal | HOUR_1,... HOUR_24 or |
| DAYS | Seasonal | SUNDAY,... SATURDAY or |
| WEEKDAYS | Seasonal | WEEK_1,... WEEK_53 or |
| | | TENDAY_1,... TENDAY_36 or |
| | | SEMIMONTH_1,... SEMIMONTH_24 or |
| | | JANUARY,... DECEMBER or |
| | | QTR_1, QTR_2, QTR_3, QTR_4 or |
| | | SEMIYEAR_1, SEMIYEAR_2 |
| WEEKS | Seasonal | SECOND_1,... SECOND_60 |
| TENDAYS | Seasonal | MINUTE_1,... MINUTE_60 |
| SEMIMONTHS | Seasonal | HOUR_1,... HOUR_24 |
| MONTHS | Seasonal | SUNDAY,... SATURDAY |
| QTRS | Seasonal | MONDAY,... FRIDAY |
| SEMIYEARS | Seasonal | (FRIDAY includes SATURDAY and SUNDAY) |
| | | WEEK_1,... WEEK_53 |
| | | TENDAY_1,... TENDAY_36 |
| | | SEMIMONTH_1,... SEMIMONTH_24 |
| | | JANUARY,... DECEMBER |
| | | QTR_1, QTR_2, QTR_3, QTR_4 |
| | | SEMIYEAR_1, SEMIYEAR_2 |
| CUBICTREND | Trend | LINEAR, QUAD, CUBIC |
| QUADTREND | Trend | LINEAR, QUAD |

FIG. 34

```
proc hpfevents data=sashelp.air ;

var air;

id date interval=month start='01Jan1949'D end='01Feb1950'D;

eventdef xmasrp= CHRISTMAS / BEFORE=(SLOPE=GROWTH
       DURATION=3) TYPE=RAMP RULE=MIN ;

eventdef easterrp= EASTER / BEFORE=(SLOPE=GROWTH
       DURATION=3) TYPE=RAMP RULE=MIN ;

eventdef twotiming= EASTER CHRISTMAS /
       BEFORE=(SLOPE=GROWTH DURATION=3) TYPE=RAMP
       RULE=MIN ;

eventcomb twoevents= easterrp xmasrp / RULE=MIN ;

eventdata out= evdsout1 (label='EASTER and CHRISTMAS Ramps');

eventdummy out= evdumout1 (label='Combining Timing Values');

run;
```

FIG. 35

Timing Values vs. Multiple Events

| obs | DATE | AIR | XMASRP | EASTERRP | TWOTIMING | TWOEVENTS |
|---|---|---|---|---|---|---|
| 1 | JAN1949 | 112 | 0.00000 | 0.00000 | 0.00000 | 0.00000 |
| 2 | FEB1949 | 118 | 0.00000 | 0.33333 | 0.33333 | 0.00000 |
| 3 | MAR1949 | 132 | 0.00000 | 0.66667 | 0.66667 | 0.00000 |
| 4 | APR1949 | 129 | 0.00000 | 1.00000 | 1.00000 | 0.00000 |
| 5 | MAY1949 | 121 | 0.00000 | 1.00000 | 1.00000 | 0.00000 |
| 6 | JUN1949 | 135 | 0.00000 | 1.00000 | 1.00000 | 0.00000 |
| 7 | JUL1949 | 148 | 0.00000 | 1.00000 | 1.00000 | 0.00000 |
| 8 | AUG1949 | 148 | 0.00000 | 1.00000 | 1.00000 | 0.00000 |
| 9 | SEP1949 | 136 | 0.00000 | 1.00000 | 0.00000 | 0.00000 |
| 10 | OCT1949 | 119 | 0.33333 | 1.00000 | 0.33333 | 0.33333 |
| 11 | NOV1949 | 104 | 0.66667 | 1.00000 | 0.66667 | 0.66667 |
| 12 | DEC1949 | 118 | 1.00000 | 1.00000 | 1.00000 | 1.00000 |
| 13 | JAN1950 | 115 | 1.00000 | 1.00000 | 1.00000 | 1.00000 |
| 14 | FEB1950 | 126 | 1.00000 | 1.00000 | 1.00000 | 1.00000 |

```
proc print data=evdumout1;
run;
```

| Obs | region | line | product | _NAME_ |
|---|---|---|---|---|
| 1 | 1 | 1 | 1 | AO1998_5 |
| 2 | 1 | 1 | 1 | AO1999_10 |
| 3 | 1 | 1 | 1 | AO2000_3 |
| 4 | 1 | 1 | 1 | AO2001_2 |
| 5 | 1 | 1 | 1 | AO2001_6 |
| 6 | 1 | 1 | 1 | AO2002_9 |

```
proc print data=outldatabase;
run;
```

FIG. 37

| Obs | _NAME_ | _STARTDATE_ |
|---|---|---|
| 1 | AO1999_1 | 01JAN1999 |
| 2 | AO1999_11 | 01NOV1999 |
| 3 | AO2000_12 | 01DEC2000 |
| 4 | AO2002_1 | 01JAN2002 |
| 5 | AO1998_10 | 01OCT1998 |
| 6 | AO1999_8 | 01AUG1999 |
| 7 | AO2000_4 | 01APR2000 |
| 8 | AO2001_1 | 01JAN2001 |
| 9 | AO2001_12 | 01DEC2001 |
| 10 | AO2002_12 | 01DEC2002 |
| 11 | AO2000_11 | 01NOV2000 |
| 12 | AO2001_3 | 01MAR2001 |
| 13 | AO2001_11 | 01NOV2001 |
| 14 | AO2002_2 | 01FEB2002 |
| 15 | AO2000_10 | 01OCT2000 |
| 16 | AO2001_2 | 01FEB2001 |
| 17 | AO2001_4 | 01APR2001 |
| 18 | AO2002_3 | 01MAR2002 |
| 19 | AO1998_11 | 01NOV1998 |
| 20 | AO1999_9 | 01SEP1999 |
| 21 | AO2001_7 | 01JUL2001 |
| 22 | AO1998_1 | 01JAN1998 |
| 23 | AO1998_2 | 01FEB1998 |
| 24 | AO1998_3 | 01MAR1998 |
| 25 | AO1998_4 | 01APR1998 |
| 26 | AO1998_5 | 01MAY1998 |
| 27 | AO1998_6 | 01JUN1998 |
| 28 | AO1998_7 | 01JUL1998 |
| 29 | AO1998_8 | 01AUG1998 |
| 30 | AO1998_12 | 01DEC1998 |
| 31 | AO1999_2 | 01FEB1999 |
| 32 | AO1999_3 | 01MAR1999 |
| 33 | AO1999_4 | 01APR1999 |
| 34 | AO1999_5 | 01MAY1999 |
| 35 | AO1999_6 | 01JUN1999 |
| 36 | AO1999_7 | 01JUL1999 |
| 37 | AO1999_12 | 01DEC1999 |
| 38 | AO2000_1 | 01JAN2000 |
| 39 | AO2000_2 | 01FEB2000 |
| 40 | AO2000_3 | 01MAR2000 |
| 41 | AO2000_5 | 01MAY2000 |
| 42 | AO2000_6 | 01JUN2000 |
| 43 | AO2000_7 | 01JUL2000 |
| 44 | AO2000_8 | 01AUG2000 |
| 45 | AO2000_9 | 01SEP2000 |
| 46 | AO2001_5 | 01MAY2001 |
| 47 | AO2001_6 | 01JUN2001 |
| 48 | AO2001_8 | 01AUG2001 |
| 49 | AO2001_10 | 01OCT2001 |
| 50 | AO2002_4 | 01APR2002 |
| 51 | AO2002_5 | 01MAY2002 |
| 52 | AO2002_7 | 01JUL2002 |
| 53 | AO2002_8 | 01AUG2002 |
| 54 | AO2002_9 | 01SEP2002 |
| 55 | AO2002_10 | 01OCT2002 |
| 56 | AO2002_11 | 01NOV2002 |
| 57 | AO1998_9 | 01SEP1998 |
| 58 | AO1999_10 | 01OCT1999 |
| 59 | AO2001_9 | 01SEP2001 |
| 60 | AO2002_6 | 01JUN2002 |

```
proc print data=out1_reg1_line1_prod1;
run;
```

FIG. 38

```
1000  * make data set;
      data work.intv;
        set sashelp.workers;
        if date >='01oct80'd then electric = electric+100;
        drop masonry;
      run;

1002  * define event 'promotion';
      proc hpfevents data=work.intv lead=12;
        id date interval=month;
        eventdef promotion= '01oct80'd / TYPE=LS;
        eventdata out= evdsout1 (label='list of events');
      run;

1004  * make specs;
      proc hpfarimaspec modelrepository=sasuser.mycat
        specname=sp1
        speclabel="ARIMA(0,1,1) No Intercept";
      dependent symbol=Y q=1 diflist=1 noint;
      run;

proc hpfarimaspec modelrepository=sasuser.mycat
        specname=sp2
        speclabel="ARIMA(0,1,2)(0,1,1)_12 No Intercept";
      dependent symbol=Y q=(1,2)(12) diflist=1 12 noint;
      run;

1008  * make selection list;
      proc hpfselect modelrepository=sasuser.mycat
        selectname=myselect
        selectlabel="My Selection List";
        select select=mape holdout=12;
        spec sp1 sp2/
        inputmap(symbol=Y var=electric)
        eventmap(symbol=_NONE_ event=promotion)
        ;
      run;

1010  proc hpfengine data=work.intv lead=12 outest=outest
        globalselection=myselect
        modelrepository=sasuser.mycat
        inevent=evdsout1;
        id date interval=month;
        forecast electric / task = select;
      run;
```

FIG. 40

```
* make data set;
data work_intv;
    set sashelp.workers;
    if date >= '01oct80'd then electric = electric+100;
    drop masonry;
run;

proc hpfdiag data=work_intv print=all seasonality=12;
    id date interval=month;
    forecast electric;
    event LS01OCT1980D;
    trend diff=1 sdiff=1;
    arimax ;
run;
```

1050 → (first block)

1052 → (second block)

FIG. 42

The HPFDIAGNOSE Procedure

Minimum Information Criterion

| Lags | MA 0 | MA 1 | MA 2 | MA 3 | MA 4 | MA 5 |
|------|------|------|------|------|------|------|
| AR 0 | 5.883729 | 5.949528 | 6.02335 | 6.096772 | 6.170614 | 6.241918 |
| AR 1 | 5.949355 | 6.023199 | 6.096221 | 6.169567 | 6.243324 | 6.314554 |
| AR 2 | 6.023143 | 6.096346 | 6.170056 | 6.24107 | 6.314917 | 6.38698 |
| AR 3 | 6.096554 | 6.169937 | 6.240963 | 6.314929 | 6.387728 | 6.459893 |
| AR 4 | 6.170396 | 6.243647 | 6.314666 | 6.387965 | 6.461478 | 6.533759 |
| AR 5 | 6.241435 | 6.314684 | 6.386682 | 6.459847 | 6.533716 | 6.60647 |

Functional Transformation Test

| Variable | Functional Transform |
|----------|----------------------|
| ELECTRIC | NONE |

ARIMA Model Specification

| Variable | Functional Transform | Constant | p | d | q | P | D | Q | Seasonality | Model Criterion | Statistic |
|----------|----------------------|----------|---|---|---|---|---|---|-------------|-----------------|-----------|
| ELECTRIC | NONE | NO | 0 | 1 | 0 | 0 | 1 | 1 | 12 | RMSE | 13.680 |

ARIMA Model Specification

| Variable | Status |
|----------|--------|
| ELECTRIC | OK |

ARIMA Event Selection

| Event Name | Selected | d | D | Status |
|------------|----------|---|---|--------|
| LS01OCT1980D | YES | 1 | 1 | OK |

ARIMA Outlier Selection

| Variable | Type | Obs | Time | Chi-Square | Approx Pr > ChiSq |
|----------|------|-----|------|------------|-------------------|
| ELECTRIC | LS | 17 | MAY1978 | 10.07 | 0.0015 |

ARIMA Model Specification After Adjusting for Events and Outliers

| Variable | Functional Transform | Constant | p | d | q | P | D | Q | Seasonality | Outlier | Event |
|----------|----------------------|----------|---|---|---|---|---|---|-------------|---------|-------|
| ELECTRIC | NONE | NO | 0 | 1 | 0 | 0 | 1 | 1 | 12 | 1 | 1 |

ARIMA Model Specification After Adjusting for Events and Outliers

| Variable | Model Criterion | Statistic | Status |
|----------|-----------------|-----------|--------|
| ELECTRIC | RMSE | 3.0477 | OK |

FIG. 43

```
proc hpfevents data=sashelp.air ;
   var air;
   id date interval=month start='01Jan1951'D end='31Dec1951'D;
   eventdef infgg= '01Jun1951'D   /  TYPE=RAMP BEFORE=(SLOPE=GROWTH DURATION=ALL)
                                     AFTER=(SLOPE=GROWTH DURATION=ALL);
   eventdef infgd= '01Jun1951'D   /  TYPE=RAMP BEFORE=(SLOPE=GROWTH DURATION=ALL)
                                     AFTER=(SLOPE=DECAY DURATION=ALL) ;
   eventdef infdg= '01Jun1951'D   /  TYPE=RAMP BEFORE=(SLOPE=DECAY DURATION=ALL)
                                     AFTER=(SLOPE=GROWTH DURATION=ALL) ;
   eventdef infdd= '01Jun1951'D   /  TYPE=RAMP BEFORE=(SLOPE=DECAY DURATION=ALL)
                                     AFTER=(DURATION=ALL SLOPE=DECAY) ;

eventdef minfgg= '01Jun1951'D  /  TYPE=RAMP BEFORE=(SLOPE=GROWTH DURATION=4)
                                     AFTER=(SLOPE=GROWTH DURATION=ALL) ;
   eventdef minfgd= '01Jun1951'D  /  TYPE=RAMP BEFORE=(SLOPE=GROWTH DURATION=4)
                                     AFTER=(SLOPE=DECAY DURATION=ALL) ;
   eventdef minfdg= '01Jun1951'D  /  TYPE=RAMP BEFORE=(SLOPE=DECAY DURATION=4)
                                     AFTER=(SLOPE=GROWTH DURATION=ALL);
   eventdef minfdd= '01Jun1951'D  /  TYPE=RAMP BEFORE=(SLOPE=DECAY DURATION=4)
                                     AFTER=(SLOPE=DECAY DURATION=ALL) ;

eventdef monlygg= '01Jun1951'D /  TYPE=RAMP BEFORE=(SLOPE=GROWTH DURATION=4);
   eventdef monlygd= '01Jun1951'D /  TYPE=RAMP BEFORE=(SLOPE=GROWTH DURATION=4)
                                     AFTER=(SLOPE=DECAY);
   eventdef monlydg= '01Jun1951'D /  TYPE=RAMP BEFORE=(SLOPE=GROWTH) ;
   eventdef monlydd= '01Jun1951'D /  TYPE=RAMP BEFORE=(SLOPE=DECAY DURATION=4)
                                     AFTER=(SLOPE=DECAY);
   . . .
```

FIG. 44

```
eventdef ninfgg= '01Jun1951'D    / TYPE=RAMP BEFORE=(SLOPE=GROWTH DURATION=ALL)
                                   AFTER=(SLOPE=GROWTH DURATION=2) ;
eventdef ninfgd= '01Jun1951'D    / TYPE=RAMP BEFORE=(SLOPE=GROWTH DURATION=ALL)
                                   AFTER=(SLOPE=DECAY DURATION=2) ;
eventdef ninfdg= '01Jun1951'D    / TYPE=RAMP BEFORE=(SLOPE=DECAY DURATION=ALL)
                                   AFTER=(SLOPE=GROWTH DURATION=2) ;
eventdef ninfdd= '01Jun1951'D    / TYPE=RAMP BEFORE=(SLOPE=DECAY DURATION=ALL)
                                   AFTER=(SLOPE=DECAY DURATION=2) ;

eventdef nonlygg= '01Jun1951'D   / TYPE=RAMP AFTER=(SLOPE=GROWTH DURATION=2) ;
eventdef nonlygd= '01Jun1951'D   / TYPE=RAMP AFTER=(SLOPE=DECAY DURATION=2)
                                   BEFORE=(SLOPE=GROWTH) ;
eventdef nonlydg= '01Jun1951'D   / TYPE=RAMP BEFORE=(SLOPE=DECAY)
                                   AFTER=(SLOPE=GROWTH DURATION=2) ;
eventdef nonlydd= '01Jun1951'D   / TYPE=RAMP BEFORE=(SLOPE=DECAY)
                                   AFTER=(SLOPE=DECAY DURATION=2) ;

eventdef mngg= '01Jun1951'D      / TYPE=RAMP BEFORE=(SLOPE=GROWTH DURATION=4)
                                   AFTER=(SLOPE=GROWTH DURATION=2) ;
eventdef mngd= '01Jun1951'D      / TYPE=RAMP BEFORE=(SLOPE=GROWTH DURATION=4)
                                   AFTER=(SLOPE=DECAY DURATION=2) ;
eventdef mndg= '01Jun1951'D      / TYPE=RAMP BEFORE=(SLOPE=DECAY DURATION=4)
                                   AFTER=(SLOPE=GROWTH DURATION=2) ;
eventdef mndd= '01Jun1951'D      / TYPE=RAMP BEFORE=(SLOPE=DECAY DURATION=4)
                                   AFTER=(SLOPE=DECAY DURATION=2) ;

eventdata  out= rampds      (label='Ramps Using DURATION= and SLOPE=');
eventdummy out= rampdummies (label='Dummy Variables for Ramps');
run;
```

| Obs | DATE | AIR | INFGG | INFGDG | INFDG | INFGG | INFFGD | INFFDG | HINFGG | HINFDG | HINFDD | MONLYGG | MONLYGD | MONLYDG | MONLYDD |
|---|---|---|---|---|---|---|---|---|---|---|---|---|---|---|---|
| 1 | JAN1951 | 145 | -5 | -5 | 5 | 0.00 | 0.00 | 0.00 | 1.00 | 0.00 | 0.00 | 0.00 | 0.00 | 1.00 |
| 2 | FEB1951 | 150 | -4 | -4 | 4 | 0.00 | 0.00 | 0.00 | 1.00 | 0.00 | 0.00 | 0.00 | 0.00 | 1.00 |
| 3 | MAR1951 | 178 | -3 | -3 | 3 | 0.25 | 0.25 | 0.75 | 0.75 | 0.25 | 0.25 | 0.75 | 0.75 |
| 4 | APR1951 | 163 | -2 | -2 | 2 | 0.50 | 0.50 | 0.50 | 0.50 | 0.50 | 0.50 | 0.50 | 0.50 |
| 5 | MAY1951 | 172 | -1 | -1 | 1 | 0.75 | 0.75 | 0.25 | 0.25 | 0.75 | 0.75 | 0.25 | 0.25 |
| 6 | JUN1951 | 178 | 0 | 0 | 0 | 1.00 | 1.00 | 0.00 | 0.00 | 1.00 | 1.00 | 0.00 | 0.00 |
| 7 | JUL1951 | 199 | 1 | -1 | -1 | 1.25 | 0.25 | -0.25 | 0.00 | 1.00 | 0.00 | 0.00 | 0.00 |
| 8 | AUG1951 | 199 | 2 | -2 | -2 | 1.50 | 0.50 | -0.50 | 0.00 | 1.00 | 0.00 | 0.00 | 0.00 |
| 9 | SEP1951 | 184 | 3 | -3 | -3 | 1.75 | 0.75 | -0.75 | 0.00 | 1.00 | 0.00 | 0.00 | 0.00 |
| 10 | OCT1951 | 162 | 4 | -4 | -4 | 2.00 | 1.00 | -1.00 | 0.00 | 1.00 | 0.00 | 0.00 | 0.00 |
| 11 | NOV1951 | 146 | 5 | -5 | -5 | 2.25 | 1.25 | -1.25 | 0.00 | 1.00 | 0.00 | 0.00 | 0.00 |
| 12 | DEC1951 | 166 | 6 | -6 | -6 | 2.50 | 1.50 | -1.50 | 0.00 | 1.00 | 0.00 | 0.00 | 0.00 |

| Obs | NINFGG | NINFGD | NINFDG | NINFDD | NONLYGG | NONLYGD | NONLYDG | NONLYDD | MNGG | MNGD | MNDG | MNDD |
|---|---|---|---|---|---|---|---|---|---|---|---|---|
| 1 | 2.5 | -1.5 | 2.5 | 3.5 | 0.0 | 0.0 | 1.0 | 1.0 | 0.00000 | 0.00 | 1.00 | 1.00000 |
| 2 | 2.0 | -1.0 | 2.0 | 3.0 | 0.0 | 0.0 | 1.0 | 1.0 | 0.00000 | 0.00 | 1.00 | 1.00000 |
| 3 | 1.5 | -0.5 | 1.5 | 2.5 | 0.0 | 0.0 | 1.0 | 1.0 | 0.16667 | 0.25 | 0.75 | 0.83333 |
| 4 | 1.0 | 0.0 | 1.0 | 2.0 | 0.0 | 0.0 | 1.0 | 1.0 | 0.33333 | 0.50 | 0.50 | 0.66667 |
| 5 | 0.5 | 0.5 | 0.5 | 1.5 | 0.0 | 0.0 | 1.0 | 1.0 | 0.50000 | 0.75 | 0.25 | 0.50000 |
| 6 | 0.0 | 1.0 | 0.0 | 1.0 | 0.0 | 0.0 | 1.0 | 1.0 | 0.66667 | 1.00 | 0.00 | 0.33333 |
| 7 | 0.5 | 0.5 | 0.5 | 0.5 | 0.5 | 0.5 | 0.5 | 0.5 | 0.83333 | 0.50 | 0.50 | 0.16667 |
| 8 | 1.0 | 0.0 | 1.0 | 0.0 | 1.0 | 1.0 | 0.0 | 0.0 | 1.00000 | 0.00 | 1.00 | 0.00000 |
| 9 | 1.0 | 0.0 | 1.0 | 0.0 | 1.0 | 1.0 | 0.0 | 0.0 | 1.00000 | 0.00 | 1.00 | 0.00000 |
| 10 | 1.0 | 0.0 | 1.0 | 0.0 | 1.0 | 1.0 | 0.0 | 0.0 | 1.00000 | 0.00 | 1.00 | 0.00000 |
| 11 | 1.0 | 0.0 | 1.0 | 0.0 | 1.0 | 1.0 | 0.0 | 0.0 | 1.00000 | 0.00 | 1.00 | 0.00000 |
| 12 | 1.0 | 0.0 | 1.0 | 0.0 | 1.0 | 1.0 | 0.0 | 0.0 | 1.00000 | 0.00 | 1.00 | 0.00000 |

```
proc print data=rampdummies;
run;
```

FIG. 46

```
axis2 label=(angle=90 'Dummy Variables');

symbol1 i=join v='star' c=black;

symbol2 i=join v='circle' c=red;

symbol3 i=join v='square' c=red;

legend1 label=none value=('Ramp with Extended Growth'
                          'Ramp with Extended Decay'
                          'Finite Ramp');

proc gplot data=rampdummies ;
    plot minfgg * date = 3
         minfgd * date = 2
         monlygg * date = 1 / overlay legend=legend1 vaxis=axis2;
run;
```

FIG. 47

COMPUTER-IMPLEMENTED SYSTEMS AND METHODS FOR DEFINING EVENTS

CROSS-REFERENCE TO RELATED APPLICATIONS

This application is related to and claims the benefit of and priority to U.S. Provisional Patent Application 60/679,093 filed May 9, 2005 entitled "Computer-Implemented Forecasting Systems And Methods," the entire document (e.g., specification, drawings, etc.) of which is herein expressly incorporated by reference.

TECHNICAL FIELD

The technology described in this patent document relates generally to the field of computer data modeling. More specifically, systems and methods are provided for modeling time-stamped data.

BACKGROUND

The effects of events on time-stamped data may be an important factor in creating an accurate computer model of the data, for example, to improve the predictive ability of the model. Examples of events that may affect time-stamped data include advertising campaigns, retail promotions, strikes, natural disasters, policy changes, a data recording error, etc.

The characteristics of an event may define the effect that an occurrence has on the time-stamped data and the duration of the occurrence. An event may include a single occurrence (e.g., a worker strike), multiple occurrences (e.g., a holiday), or irregular occurrences (e.g., new store openings.) Further, an occurrence may be on a fixed date or a relative date (e.g., an event may begin two weeks before Christmas.) In addition, an event may be a combination of occurrences (e.g., a retail sale that occurs over a holiday.) Thus, modeling events so that they increase the accuracy of a time series model can often be complicated.

SUMMARY

In accordance with the teachings provided herein, systems and methods for operation upon data processing devices are provided concerning the processing of time-series data. As an example, a system and method can use a first data store to store time series data, and a second data store to store definitions of events. A dummy variable is generated when data from an event's definition is applied to time series data.

As another example, a system and method can use a first data store to store time series data, and a second data store to store definitions of events. A dummy variable is generated when data from an event's definition is applied to time series data. The first and second data stores comprise separate data stores for storing their respective time series data and event definitions.

BRIEF DESCRIPTION OF THE DRAWINGS

FIG. 12 depicts a table for use in calculating beginning and ending observations for events.

FIGS. 13 and 14 depict a table of different event types for infinite durations.

FIGS. 15-17 depict a table of different event types for finite durations.

FIG. 21 shows an example of PROC HPFEVENTS wherein the program is used to create events and dummies.

FIG. 24 depicts code containing a set of HPFEVENTS statements.

FIG. 26 illustrates different statements and options that can be used with the HPFEVENTS procedure.

FIG. 27 depicts a table showing an example of holiday date keywords and definitions that can be used in a timing value list and their definitions.

FIG. 28 depicts a table showing an example of seasonal date keywords that can be used in a timing value list and their definitions.

FIGS. 29 and 30 depict a table showing default duration values and how the basic event shape depends on the duration value.

FIG. 31 depicts a table that explains how a RULE is interpreted when the value for an observation is defined by multiple timing values.

FIG. 32 depicts a table describing how to construct a predefined event keyword.

FIG. 33 depicts a table that provides a description of how date and observation numbers are encoded into AO and LS type predefined events.

FIG. 34 depicts a table describing predefined event group keywords.

FIG. 35 depicts code that defines a ramp for Christmas for certain observations.

FIG. 37 depicts output for examining data sets.

FIG. 38 depicts an event output data set which is condensed and has the duplicate events eliminated.

FIG. 40 depicts code to illustrate how the HPFEVENTS procedure can be used to include events in the automatic forecasting of time series data.

FIG. 42 depicts code for illustrating the use of predefined event keywords directly in other procedures.

FIG. 43 depicts output PROC HPFDIAGNOSE that shows that a model was selected that included the level shift occurring at October 1980.

FIGS. 44 and 45 depict code to create dummies.

FIG. 46 depicts output from code configured to create dummies.

FIG. 47 depicts code that is to produce a plot of finite and extended dummy variables.

DETAILED DESCRIPTION

Figure 1:
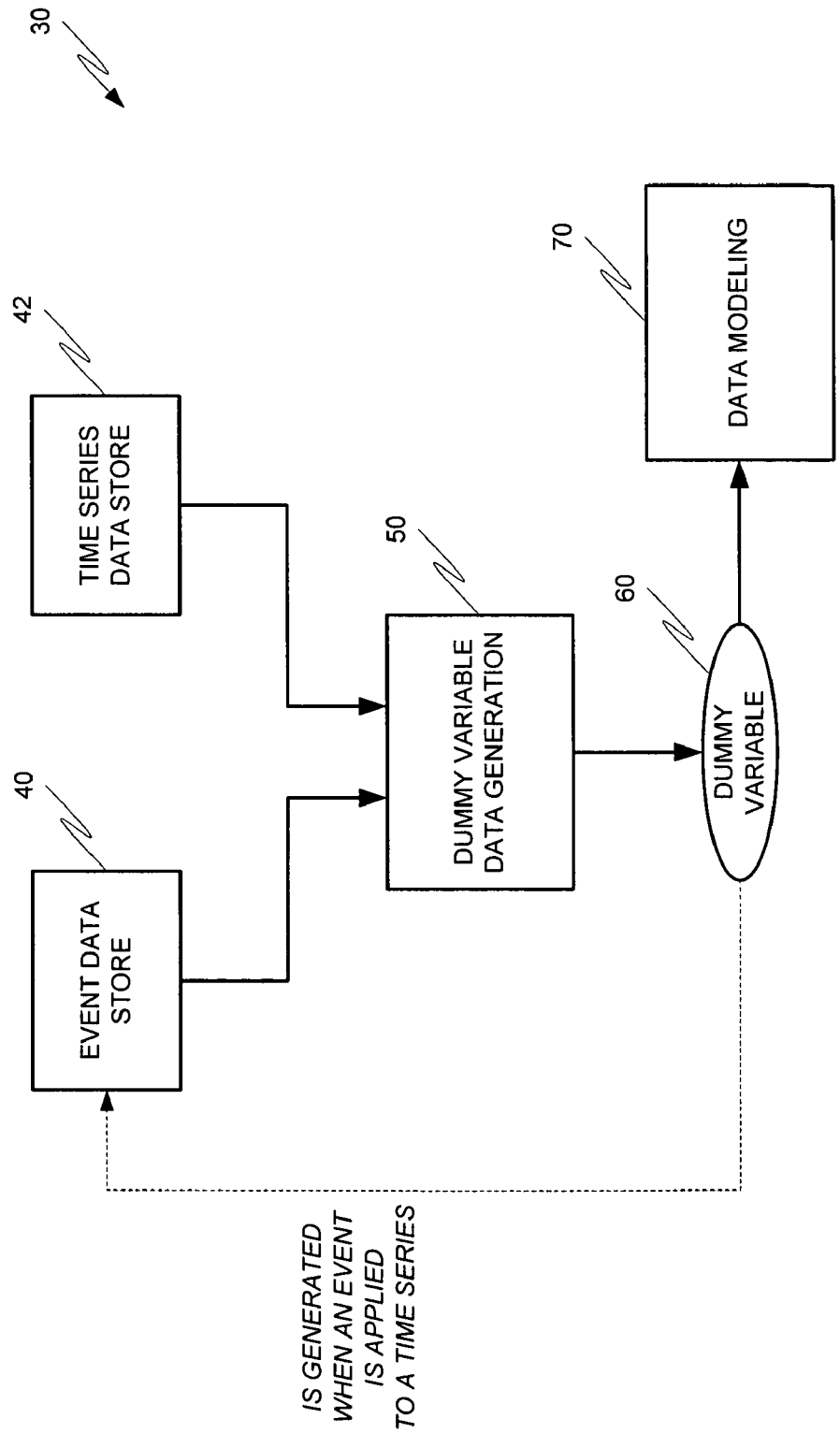
FIG. 1 is a block diagram depicting software and computer components utilized in generating dummy variables.

FIG. 1 depicts at 30 a system for creating and managing events associated with one or more time series for the purpose of analysis. The system 30 can create events, read events from an event data store 40, and write events to an event data store 40. The system 30 can also create dummy variable data 60 based on those events if date information is provided.

An event is used to model any incident that disrupts the normal flow of the process that generated the time series. The characteristics of an event define the effect that an occurrence has on the time-stamped data and the duration of the occurrence.

When an event from an event data store 40 is applied to a time series, a dummy variable 60 is generated via a computer-implemented process 50 so that it may be used to analyze the impact of the event on the time series. The system 30 defines an event using a dummy variable that is independent of the time series. As an example of this independence, if the starting and ending dates of the time series change, observations are added or removed, or if the frequency of the time series changes, then dummy variable 60 is automatically generated based upon the change. The generated dummy variable(s) 60 can be saved if needed and used in analyzing a time series through a data modeling program 70, such as a time series analysis program that uses the time-stamped time series data and the generated dummy variable to generate a mathematical model.

The system 30 applies events such as Easter to any time series, applies periodic events such as every Monday to any time series, applies effects such as ramps and exponential growth or decay to any time series, and to appropriately adjust the definition when the time series is altered.

Figure 2:
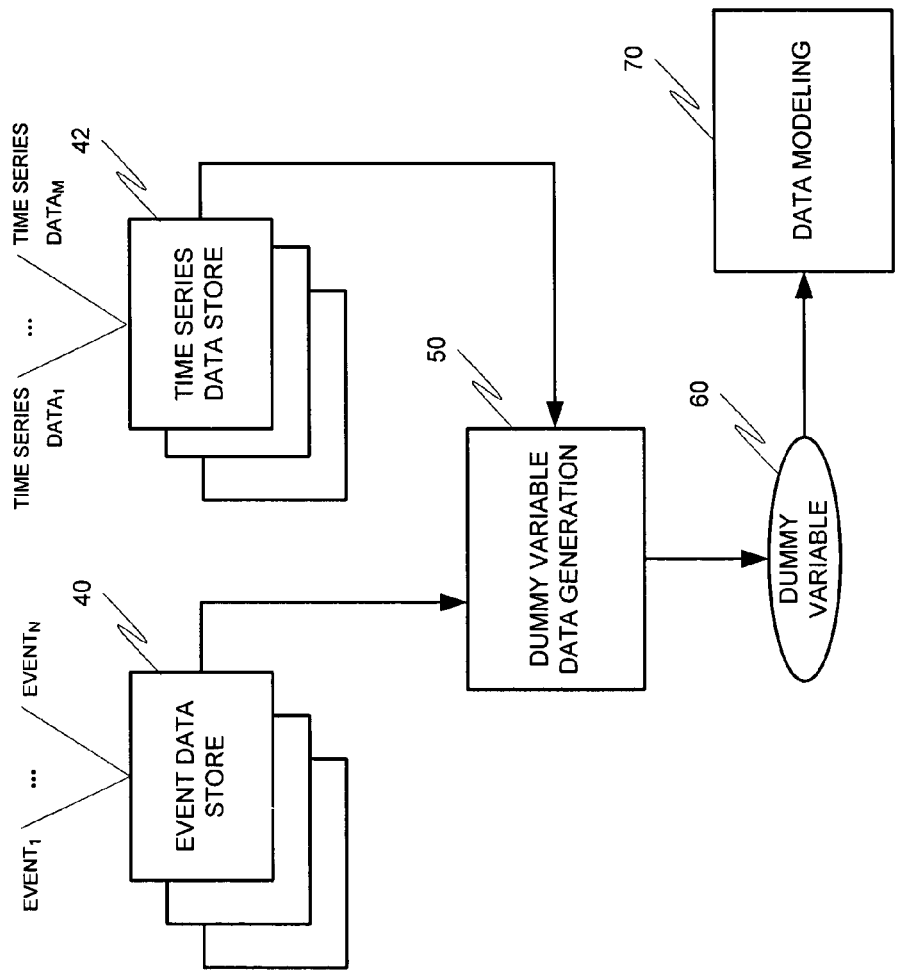
FIG. 2 is a block diagram depicting multiple data stores being used in a process for generating dummy variables.
Figure 3:
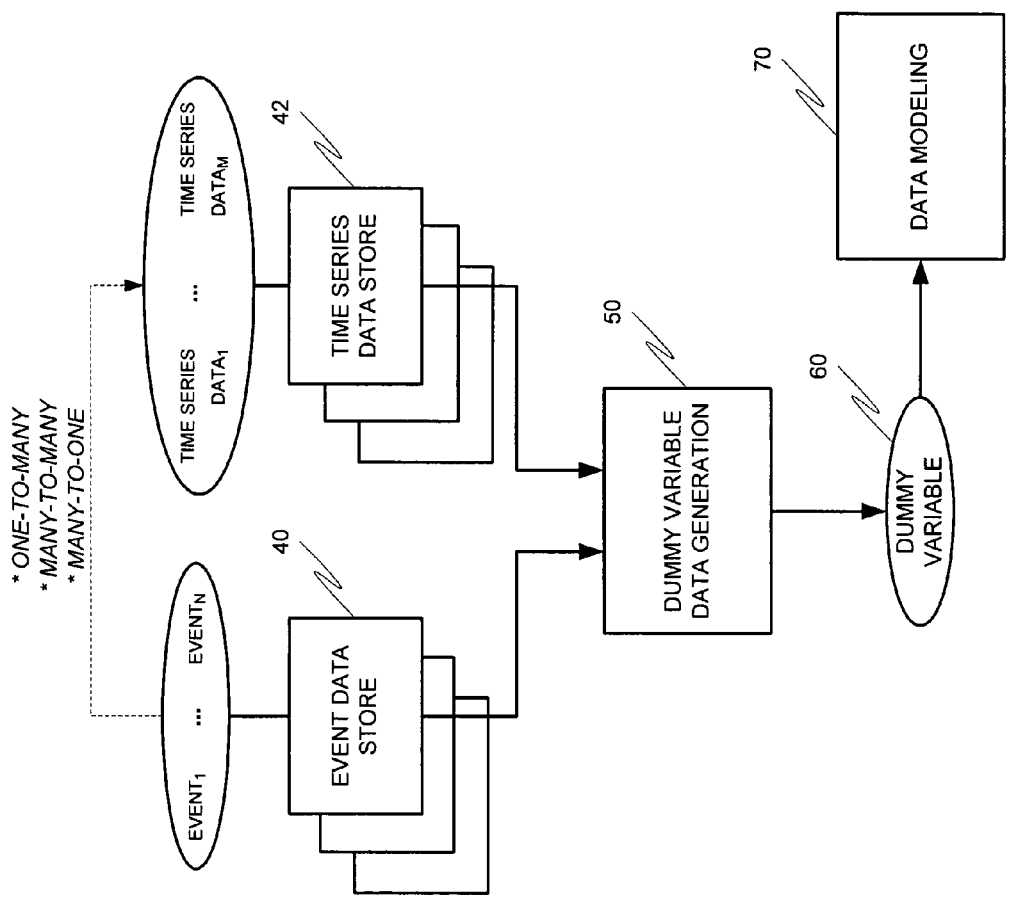
FIG. 3 is a block diagram depicting different relationships that may exist between event data and time series data.

As shown in FIG. 2, one or more events can be stored in an event data store 40 that is separate from the data store 42 that stores the time series data. Moreover a time series data store 42 can store one or more time series. It should be understood that multiple event data stores can be used to store multiple events, and that multiple time series data stores can be used to store multiple time series. As shown in FIG. 3, an event can be applied to one or more time series because an event exists separate from any time series. Still further multiple events can be applied to the same time series.

Figure 4:
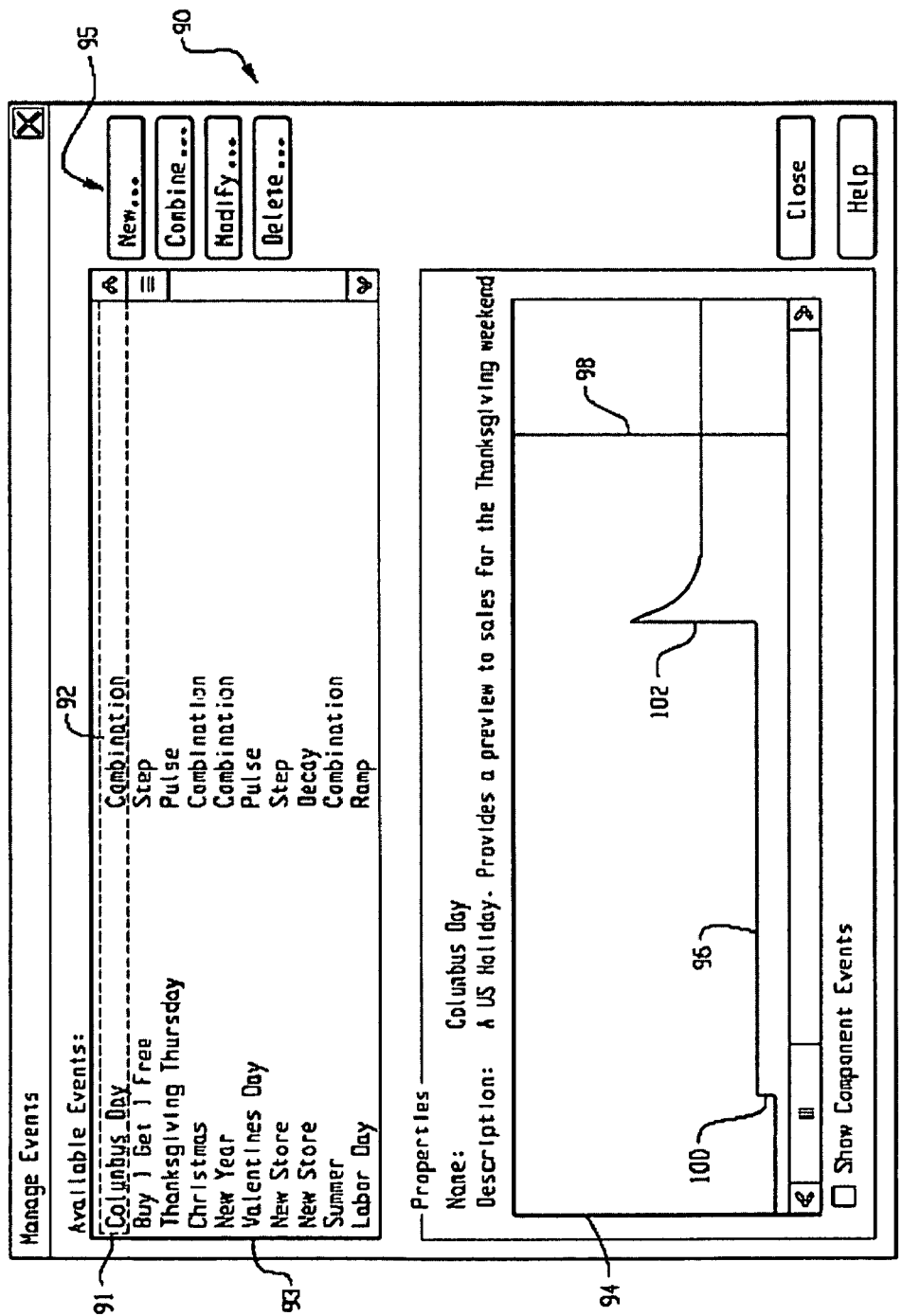
FIG. 4 depicts an example graphical user interface (GUI) for viewing a time series event.

FIGS. 4-8 illustrate an example event and a set of characteristics that the event in the example has. FIG. 4 depicts an example GUI 90 for viewing a time series event. A list of previously created events 91 along with their corresponding event types 92 are displayed in a first region 93 of the GUI 90. In addition, a graphical display of a selected event is displayed in a second region 94 of the GUI 90. Also included in the GUI 90 are a plurality of user input regions 95 (e.g., graphical buttons) for causing user input regions to open for managing stored events, such as creating a new event, combining two or more events, modifying a stored event, and deleting a stored event.

Selecting one of the stored events 91 listed in the first GUI region 93 causes the event to be displayed in the second GUI region 94. In the illustrated example, the event "Columbus Day" has been selected. A graph of the statistical properties 96 for the example "Columbus Day" event are displayed in the second GUI region 94. The example graph 96 shows the effect of the "Columbus Day" event on sales (y-axis) over a period of time (x-axis). Also displayed in the second GUI region 98 is a vertical reference 98 that indicates the present point in time. The portions of the event graph 96 that are displayed to the left of the vertical reference 98 represent the effect of the event on recorded time series data, and the portions of the event graph 96 to the right of the vertical reference are a time series model that is generated based on the recorded time series data and the defined event. The time series model displayed to the right of the vertical reference 98 provides a prediction of the effect of the event on future data.

The example "Columbus Day" event is a combination event, meaning that its statistical properties are defined from a combination of the statistical properties of two or more other stored events. In this example, the combination event is made up of a step-type event 100 and a decay-type event 102. For example, over the duration of the illustrated "Columbus Day" event, a new store may be opening, followed some period later by a sale. The result of the new store opening is a stepped increase in sales, represented by the step-type event 100, and the result of the sale is a temporary sharp increase in sales, represented by the decay-type event 102.

Figure 5:
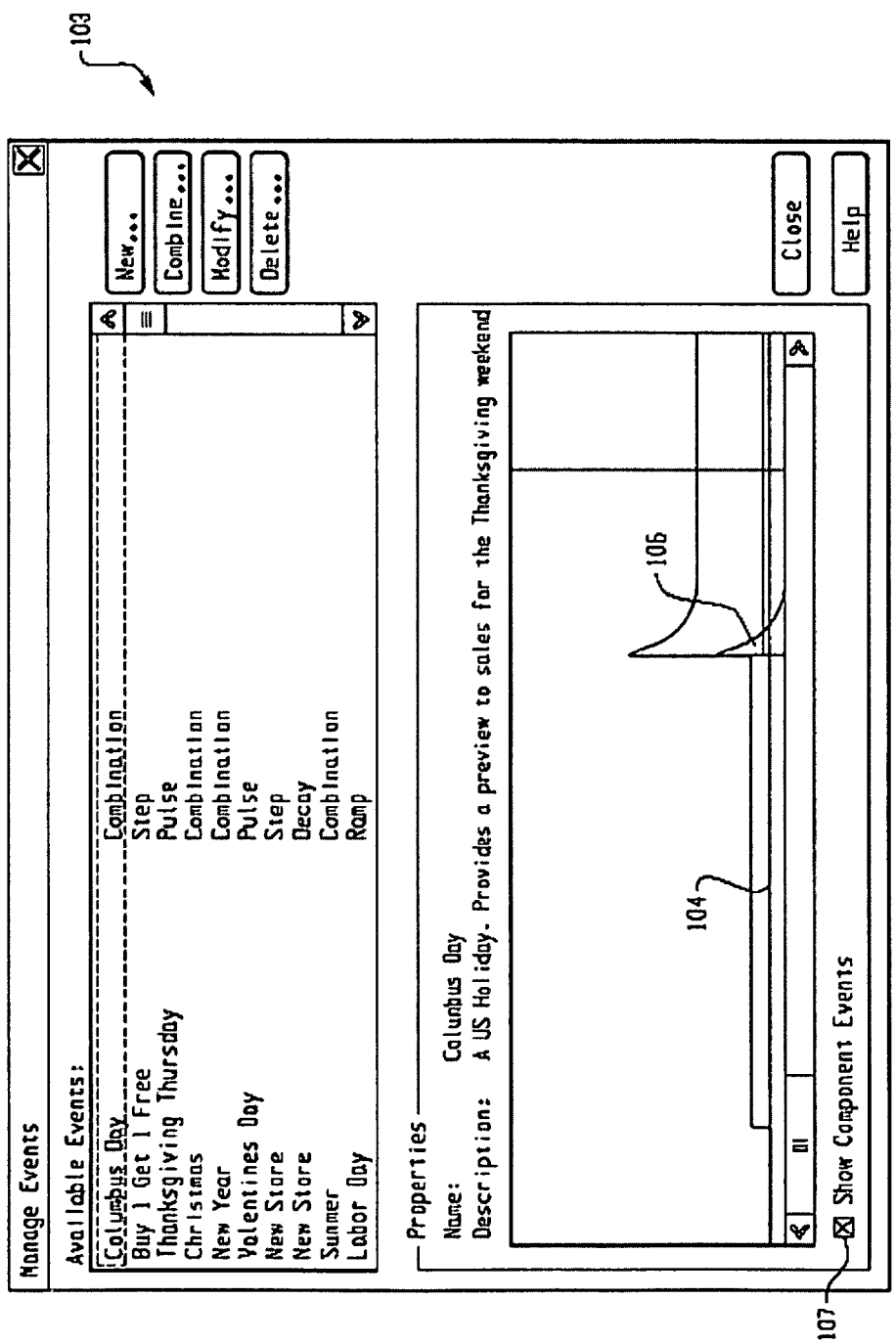
FIG. 5 depicts another example of a GUI for viewing a time series event in which the component parts of the displayed combination event are displayed.

FIG. 5 depicts another example of a GUI 103 for viewing a time series event in which the component parts 104, 106 of the displayed combination event are displayed. As illustrated, the individual statistical properties 104, 106 that make up a combination event may be displayed in a region of the GUI 103 along with the combination event by selecting a Show Component Events user input region 107 of the GUI 103. In the illustrated example, a step-type event 104 and a decay-type event 106 are the displayed component parts of the example combination-type "Columbus Day" event.

Figure 6:
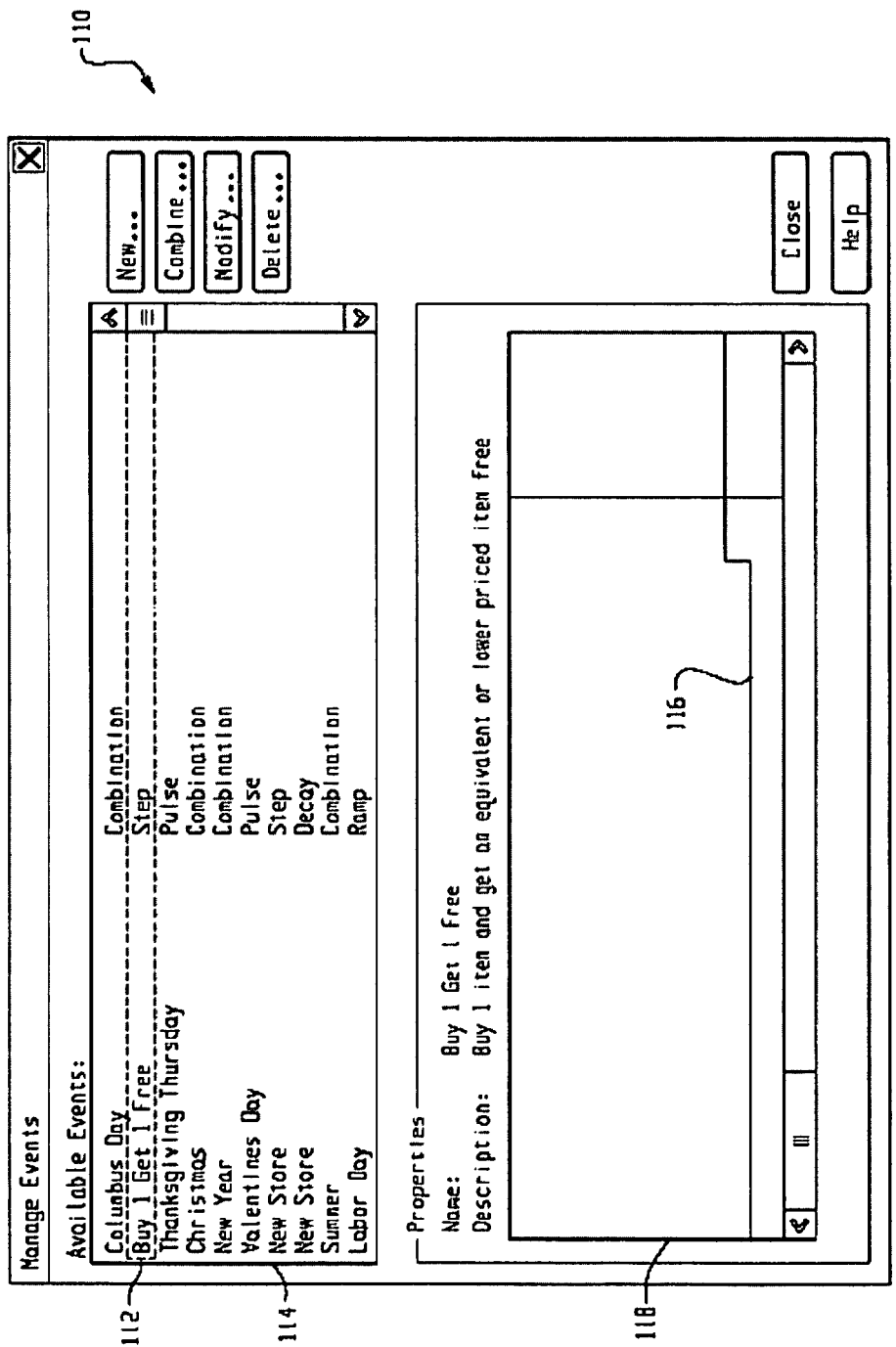
FIG. 6 depicts another example of a GUI for viewing a time series event in which a step-type event is displayed.

FIG. 6 depicts another example of a GUI 110 for viewing a time series event in which a step-type event is displayed. In this example, a user has selected a step-type event 112, entitled "Buy 1 Get 1 Free," from the first region 114 of the GUI 110. A graph 116 of the example step-type event 112 is displayed in the second GUI region 118. As illustrated, the step-type event causes a stepped increase in the time series data. Examples of events that may cause a step-type event are opening a new store, an extended sale, etc. In the illustrated example, the duration of the step-type event 116 extends beyond the displayed time period. However, step-type events may have a limited duration (e.g., in the case of an extended sale), or may have an indefinite duration (e.g., in the case of a new store).

Figure 7:
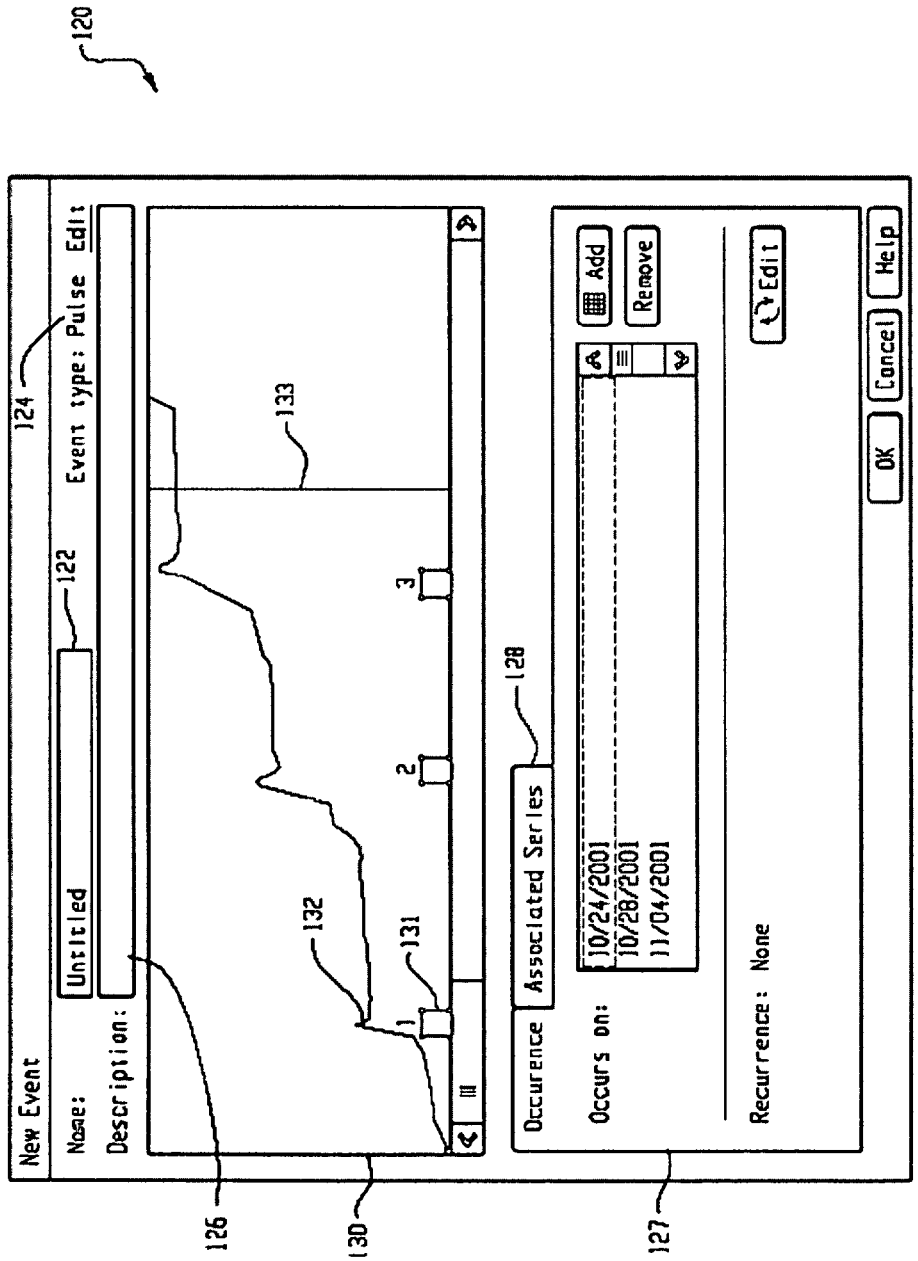
FIG. 7 depicts an example GUI for defining properties of a time series event.

FIG. 7 depicts an example GUI 120 for defining properties of a time series event. This GUI 120 may, for example, be provided by selecting the "New" user input 95 shown in FIG. 4. The GUI 120 includes user input regions 122, 124, 126 for naming the event, selecting an event type, and entering a description of the event. The GUI 120 also includes an event selection region having an Occurrence tab 127 and an Associated Series Tab 128. The Occurrence tab 127 of the event selection region may be used for defining when the event occurs and for defining the duration and recurrence of the event. The Associated Series tab 128 of the event selection region may be used for associating one or more time series 132 with the event. In addition, a display region 130 is provided for displaying a graph of the event 131 along with the associated time series data 132.

In the illustrated example, a time series event 131 having three occurrences (1, 2 and 3) is displayed in the display region 130 along with a graph of the associated time series data 132. The example event 131 is a pulse-type event having occurrences on three days, October 24, October 28 and November 4. The event 131 may, for example, have been defined by examining the graph 132 of the time series data and noting the pulse-type increases in the data and recognizing that the data spikes correspond with some particular event. For instance, a one day sale may have occurred on each of these three days, resulting in the temporary pulse-type spikes in the time series data 132. If the recurrence of the event is know (e.g., the sale will continue one a week for several months), then the event 131, which is defined with reference to the stored time series data, may be incorporated into a time series model of the data in order to predict how the event will effect future data. For instance, in the illustrated example the time series model, which is displayed to the right of the vertical reference 133, may show another pulse-type spike in the data if the event is scheduled to reoccur.

In one example, events may be added and/or modified using the display region 130 of the GUI 120. For instance, the duration of an event may be modified by clicking and dragging an edge of an event on the graph 131. A new event may be added to the graph 131, for example by right-clicking on a portion of the graph 131 or by some other suitable means.

Figure 8:
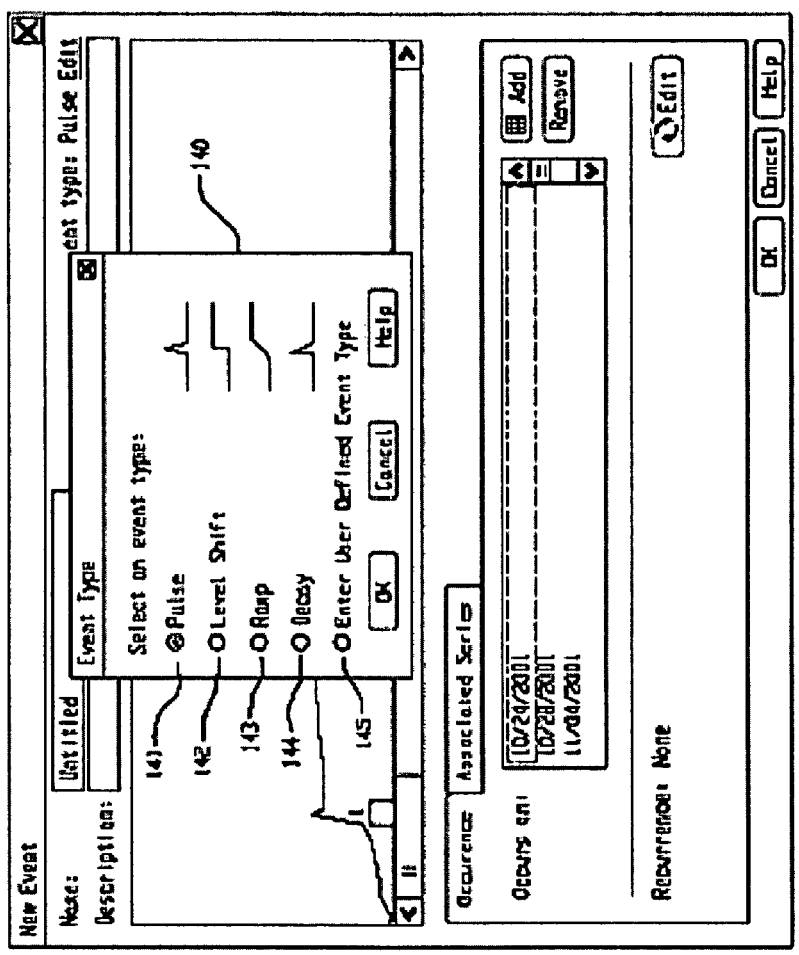
FIG. 8 depicts an example dialog window that may be used to select an event type.

FIG. 8 depicts an example dialog window 140 that may be used to select an event type. The event selection window 140 may, for example, be provided by selecting "Edit" in the user input region 124 shown in FIG. 7. The event selection window 140 includes user input regions 141-144 for selecting one of a plurality of predefined event types. Example predefined event types that may be selected include a pulse-type event 141 indicating a temporary spike in the time series data, a level shift event 142 indicating a sharp increase in the time series data, a ramp-type event 143 indicating a gradual increase in the time series data, and a decay-type event 144 indicating a sharp increase in the time series data followed by a gradual decrease. In addition, the event selection window 140 includes a user input region 145 for entering a user defined event type. For example, selecting the user defined event type region 145 may provide another user input region in which a user may insert software code to define an event type.

Figure 9:
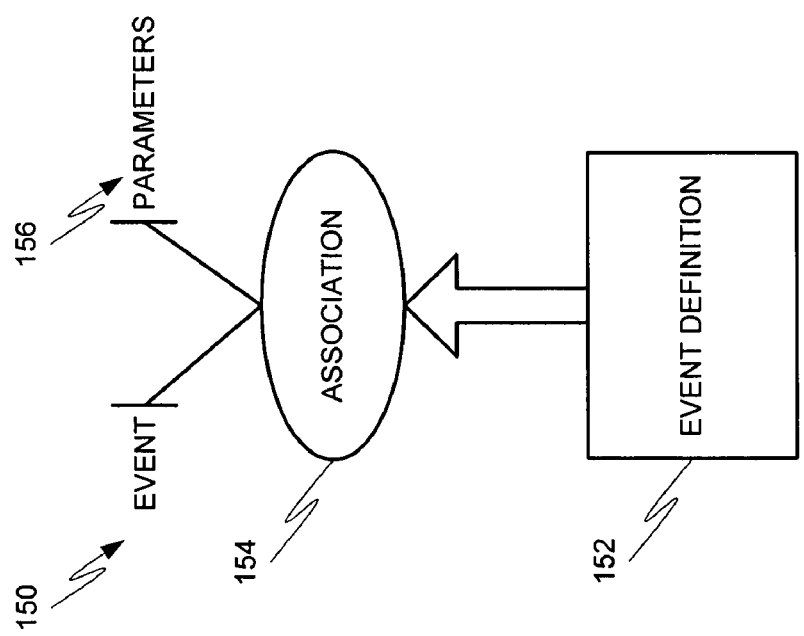
FIG. 9 is a block diagram illustrating definition of an event.
Figure 10:
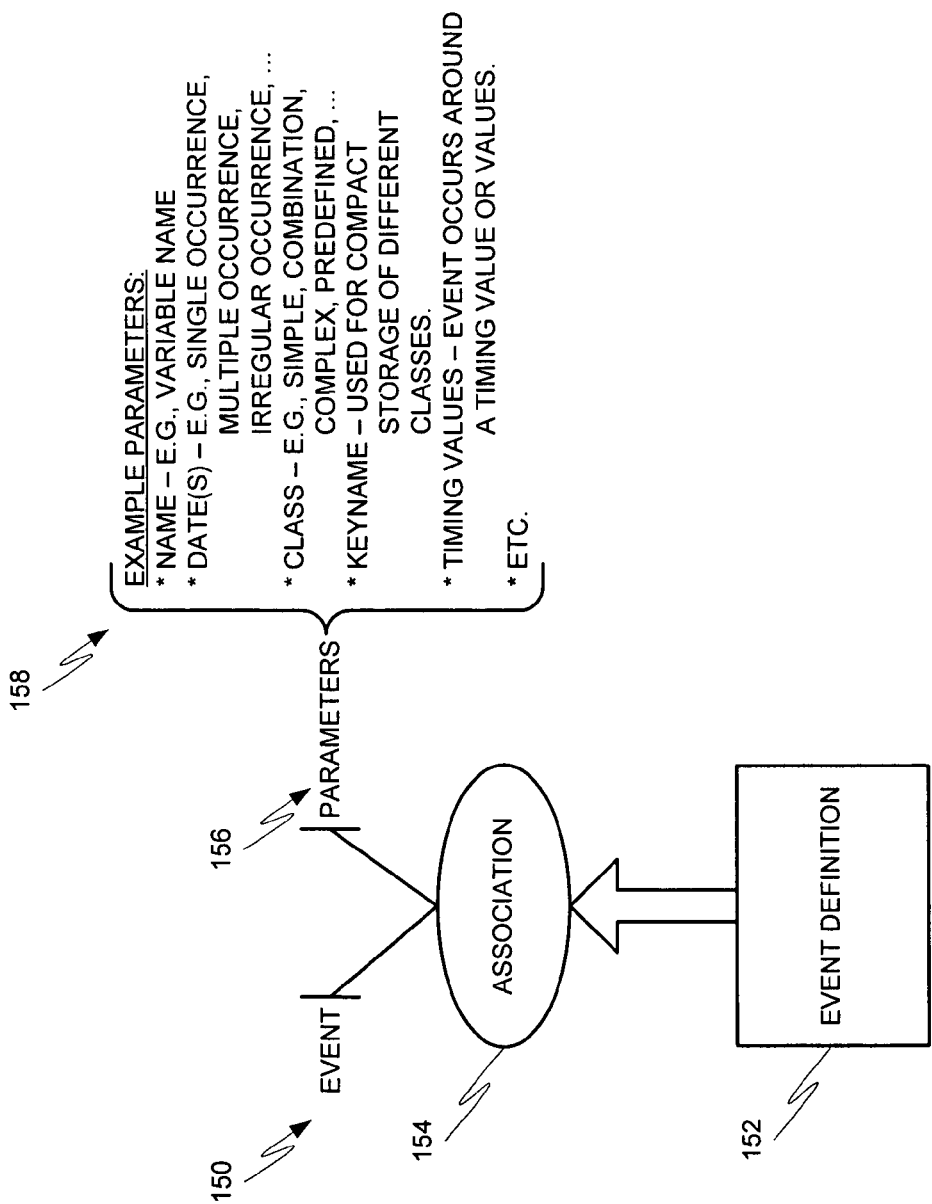
FIG. 10 is a block diagram wherein an event is be defined with parameters.

FIG. 9 illustrates that an event 150 can be defined via a definition process 152 by creating an association 154 between the event 150 and a set of parameters 156. For example and as shown at 158 on FIG. 10, an event 150 can be defined with such parameters 156 as a reference name, a date or dates associated with the event, and other parameters. A reference name is an event's variable name. After the user defines an event 150, the reference name can be used within a data analysis program, such as being used in the grammar of a SAS program wherever appropriate. This provides a user with the capability to customize the SAS system to unique user needs. Predefined event names can also be made available that describe common events such as holidays.

One or more dates can be associated with an event. As an illustration, an event may include a single occurrence (e.g., a worker strike), multiple occurrences (e.g., a holiday), or irregular occurrences (e.g., new store openings). Further, an occurrence may be on a fixed date or a relative date (e.g., an event may begin two weeks before Christmas). In addition, an event may be a combination of occurrences (e.g., a retail sale that occurs over a holiday).

Class parameters can be used to specify whether an event is a simple, combination or complex, or a predefined type of event. Events can be simple (defined only by parameters), combination (a combination of other events), complex (a group of events that must be fit into the model as a unit), or predefined (an event which will be custom made based on the times series).

A keyname parameter specifies date keywords (SIMPLE EVENT) or a predefined EVENT variable name (PREDEFINED EVENT), or an event name (COMBINATION event or COMPLEX event). This allows for compact storage of the different classes of events in a single data set.

An event occurs around a timing value or values. Type, value, shift, pulse, duration, slope, and temporary change (e.g., tcparm) parameters describe the event around each timing value. A timing value could be considered as the "center of mass" of the event. Timing values can be specified as observation numbers, date values (e.g., SAS Date values), date-time values (e.g., SAS Datetime values), date keywords (e.g., SAS Date Keywords), or a do-list of observation numbers, a do-list of dates or a do-list of datetimes. This provides flexibility in allowing the user to specify timing values in so many different ways.

Figure 11:
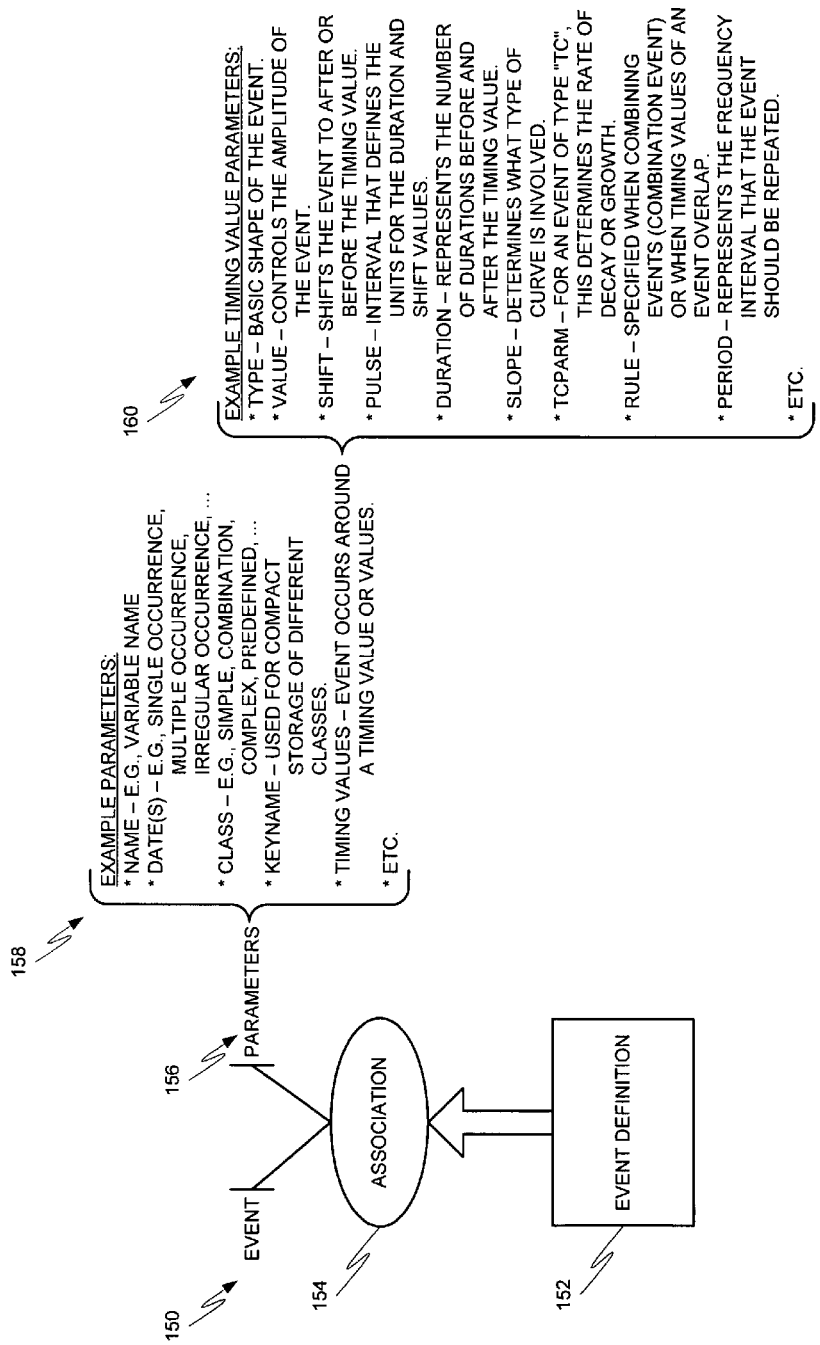
FIG. 11 is a block diagram wherein example parameters are shown that can be used to describe a timing value or values.

FIG. 11 depicts at 160 example parameters that can be used to describe a timing value or values. A type parameter specifies the type of the event. This is the basic shape of the event. As an illustration, shapes could be point, level shift, ramp, temporary ramp, temporary change, linear, quadratic, cubic, inverse and logarithmic.

A value parameter controls the amplitude of the event. For events of finite duration in which timing values do not overlap, the value is the maximum amplitude.

A shift parameter shifts the event to after (positive) or before (negative) the timing value. The shift is the number multiplied by the pulse interval.

A pulse parameter is an interval that defines the units for the duration and shift values.

A duration parameter represents the number of durations before and after the timing value. The duration values are used in conjunction with the pulse values. The default pulse value is one observation. Duration and pulse parameters guarantee that a continuous effect can be maintained over a fixed time interval which adapts to time series of different frequencies.

A slope parameter (for before and after the timing value) determines what type of curve is involved. For example for type=ramp, type=rampramp, and type=tc, the slope parameter determines whether the curve is growth or decay before and after the timing value.

A temporary change parameter (e.g., tcparm) is for an event of type=tc (i.e., temporary change) which determines the rate of decay or growth.

A rule can be specified when combining events (combination event) or when timing values of an event overlap. The values of the event can be added, or chosen by maximum, minimum, minimum non-zero, or minimum magnitude.

A period parameter represents the frequency interval at which the event should be repeated.

Interpretation of events into dummy variables is based on the event definition, the ID statement, and the time ID values of the time series.

Timing values for an event can be defined in many different ways, such as through a formula. The tables in FIGS. 12-17 illustrate examples of formulas. In the formulas, t, is the observation specified by the ith timing value in the timing value list, VALUE=v, TCPARM=φ, AFTER= (DURATION=n SLOPE=$s_a$), BEFORE=(DURATION=m SLOPE=$s_b$), and PULSE=interval.

The table in FIG. 12 shows how to calculate $t_b$ and $t_c$ which are based on the DURATION=values. The terms $t_b$ and $t_c$ are the beginning and ending observations of the event definition. (For TYPE=RAMP, the ramp persists past the top of the ramp.) Note that undefined values are set to zero after all timing values have been evaluated.

FIGS. 13-14 depict a table of different event types for infinite durations (m=all and n=all). In the figures, $\xi_{it}$ is the dummy function value for the ith timing value at observation t. Example event types in this table with associated definitions include a point event type, level event type, ramp event type, temporary ramp (tr) event type, temporary change (tc) event type, linear trend event type, quadratic trend event type, and cubic trend event type.

FIGS. 15-17 depict a table of different event types for finite durations (e.g., for finite m, n). Example event types in this table with associated definitions include a point event type, level event type, ramp event type, temporary ramp (tr) event type, temporary change (tc) event type, linear trend event type, quadratic trend event type, and cubic trend event type.

Figure 18:
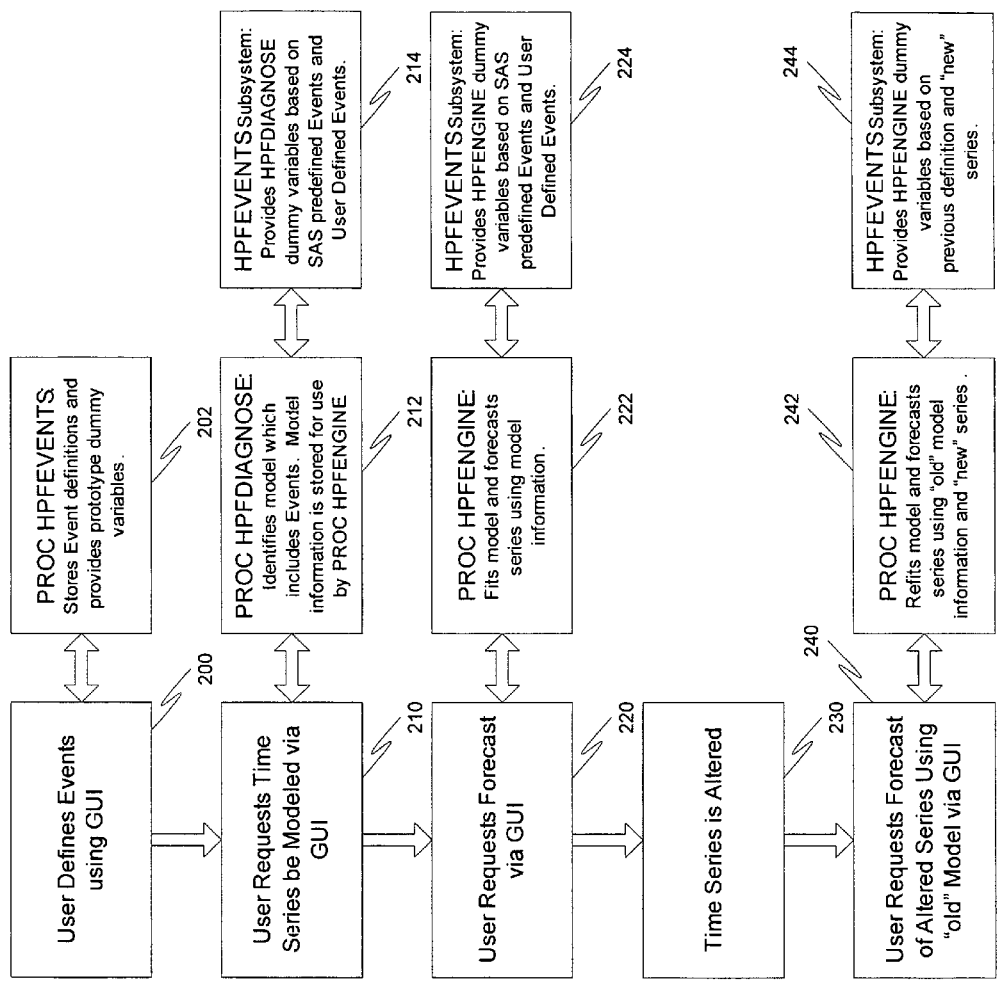
FIG. 18 is a block diagram depicting an example of using a graphical user interface (GUI) for defining events.
Figure 19:
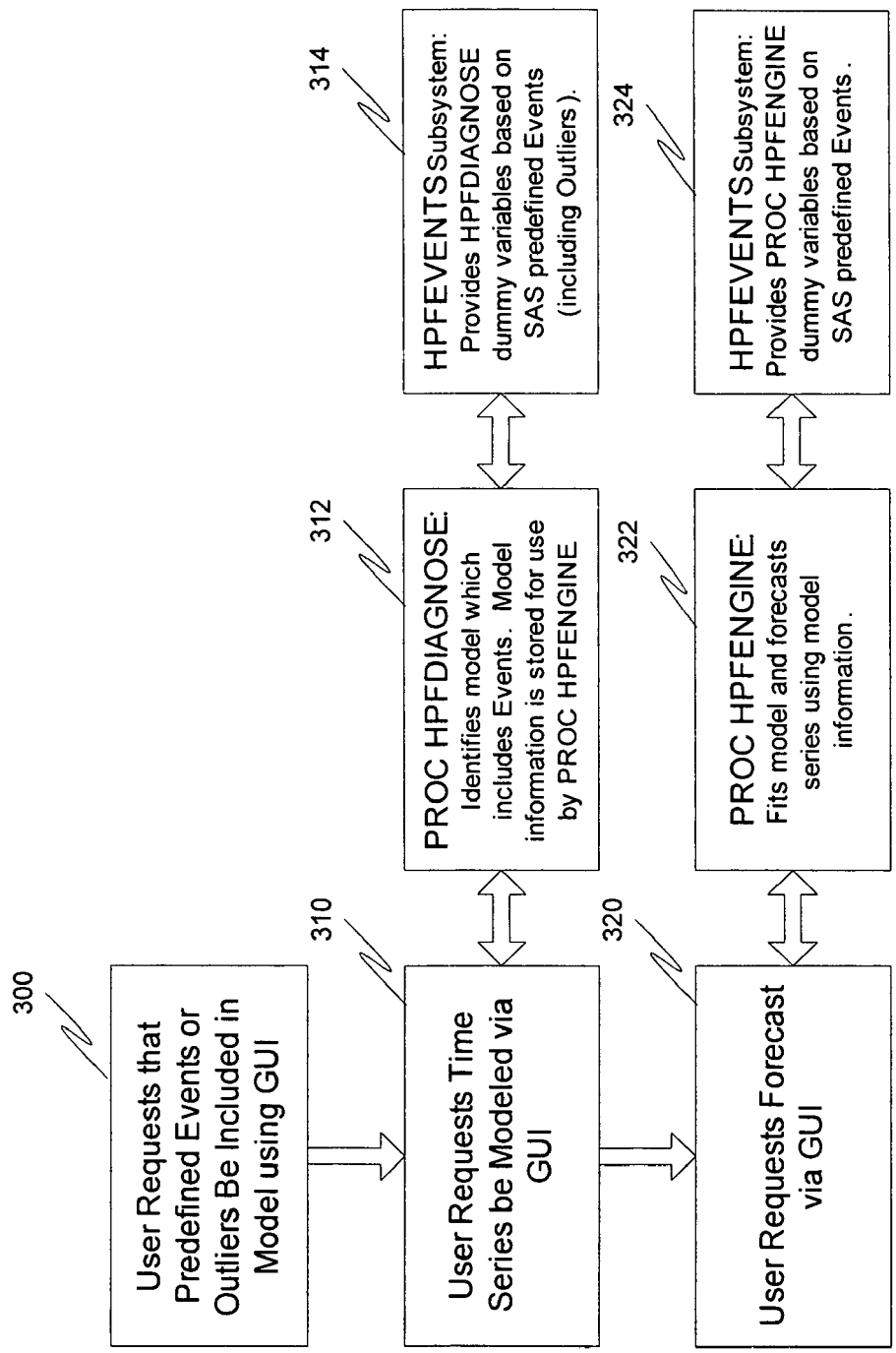
FIG. 19 is a block diagram depicting an example of using predefined events.
Figure 20:
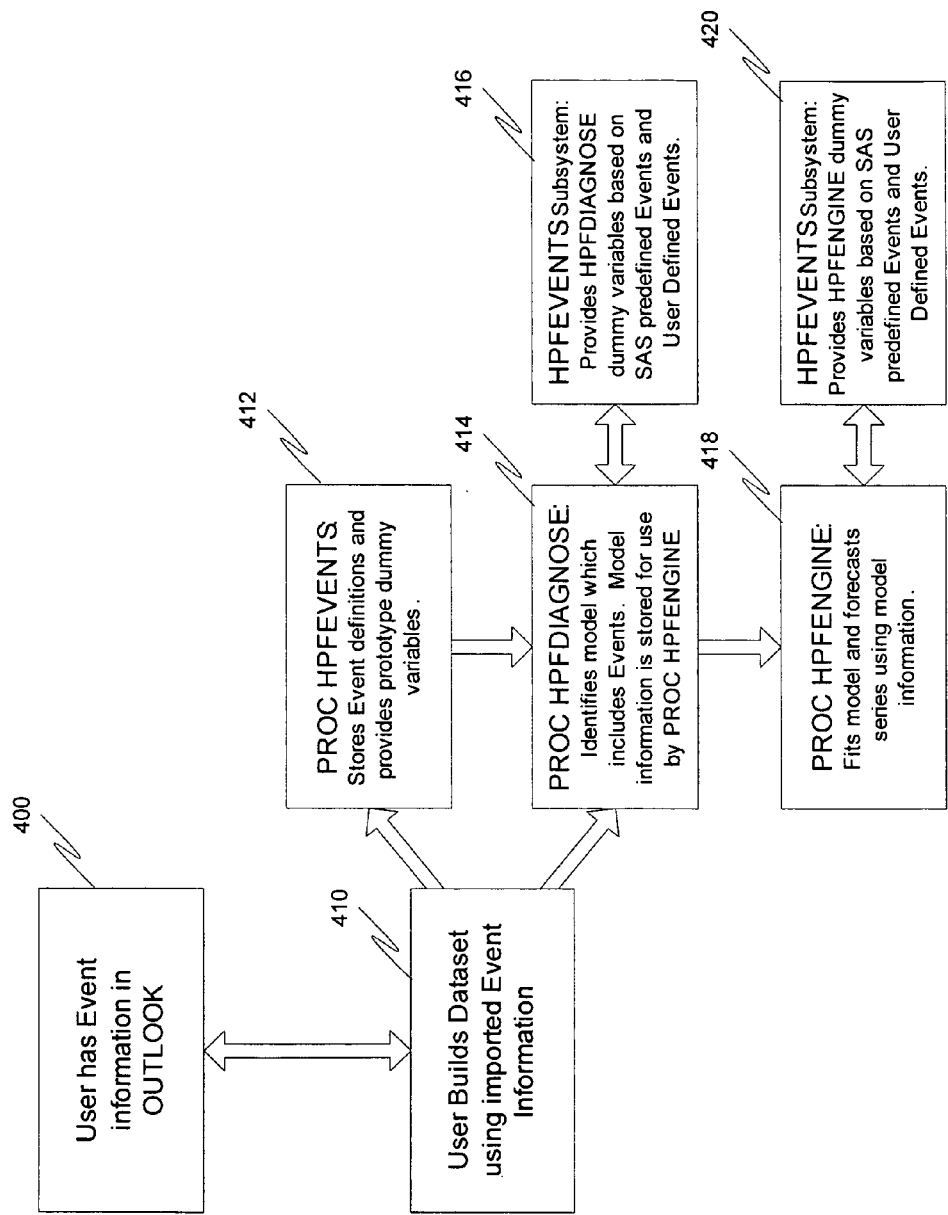
FIG. 20 is a block diagram depicting an example of various methods by which a user may input event information.

FIGS. 18-20 illustrate several of the mechanisms by which formulae and/or parameters can be associated with SAS events. FIG. 18 depicts an example of using a graphical user interface (GUI) for defining events. At process block 200, a user interacts with the GUI to define properties of an event and to associate the event with time-stamped data. The properties of the event defined using the GUI may include one or more statistical properties that indicate how the event statistically affects the time-stamped data. An example of such a GUI for defining events is disclosed in the commonly assigned patent application entitled "Systems And Methods For Handling Time-Stamped Data" (Ser. No. 11/124,920 filed May 9, 2005), which is incorporated herein by reference in its entirety.

After the user has defined one or more events using a GUI, process block 202 stores the event definitions and generates dummy variables. At process block 210, the user requests that a time series be modeled via the GUI. Process block 212 identifies the model which includes events. The model information is then stored for subsequent use by process block 222. Process block 214 provides process block 212 with the dummy variables that fit the time series that had been requested to be modeled at process block 210.

At process block 220, the user requests a forecast via the GUI. In response to the request, process block 222 fits the model and forecasts the time series using the model information. Process block 224 provides process block 222 with the dummy variables based upon what events are applicable for the situation at hand. This can be based upon predefined events as well as user predefined events.

At process block 230, the time series is altered. The altering can be due to many reasons, such as the starting and ending dates of the time series have changed, observations have been added or removed, or the frequency of the time series has changed. At process block 230, when the user requests via the GUI a forecast of the altered time series using the previous model, process block 242 fits the model and forecasts the time series using the previous model information as well as the new time series. Process block 244 automatically generates the dummy variable data based upon the previous definition and the new time series. Process block 244 provides this to process block 242 so that process block 242 can refit the model and generate a forecast of the new time series.

Another way to specify events is shown in FIG. 19 which depicts an example of using predefined events. At process block 300, a user requests via a GUI that one or more predefined events or outliers be included in a model. At process block 310, the user requests via the GUI that a time series be modeled. To accomplish this, process block 312 identifies the model which includes the events. The model information is stored for subsequent use by process block 322. Process block 314 provides process block 312 with dummy variables that are generated based upon predefined events (including any outliers).

At process block 320, the user requests that a forecast be generated. Process block 322 fits the model and forecasts the time series using the model information identified by process block 312. Process block 324 provides process block 322 with the dummy variables that are generated based upon the predefined events.

It should be understood that similar to the other process flows described herein, the steps and the order of the steps of the process flows described in FIGS. 18 and 19 may be altered, modified, removed, and/or augmented and still achieve the desired outcome. As an illustration, FIG. 20 depicts additional methods by which a user may input event information. At process block 400, a user has event information contained in a calendar application, such as Microsoft Outlook®. At process block 410, the user builds a data set using event information imported from the calendar application. Process block 412 stores the event definitions and provides prototype dummy variables. Process block 414 identifies the model which includes events. The model information is stored for subsequent use by process block 418. Process block 414 interacts with process block 416 so that it may receive dummy variables that have been generated by process block 416 based upon predefined events and user-defined events.

Process block 418 fits the model and forecasts the time series using the model information stored by process block 414. Process block 418 interacts with process block 420 so that it may receive dummy variables that have been generated by process block 420 based upon predefined events and user-defined events.

While examples have been used to disclose the invention, including the best mode, and also to enable any person skilled in the art to make and use the invention, the patentable scope of the invention is defined by claims, and may include other examples that occur to those skilled in the art. Accordingly the examples disclosed herein are to be considered non-limiting. As an illustration of the wide scope of the systems and methods disclosed herein, a software program PROC HPFDIAGNOSE can be configured to provide a comprehensive set of tools for automated univariate time series model identification, a software program PROC HPFEVENTS can be configured to generate event definitions and dummies, and a software program PROC HPFENGINE can be configured to provide an automatic way to generate forecasts for many time series or transactional data in one step. These programs can perform the functions as indicated by their respective names in the blocks of FIGS. 18-20.

More specifically with respect to the HPFDIAGNOSE program, time series data can have outliers, structural changes, and calendar effects. In the past, finding a good model for time series data usually required experience and expertise in time series analysis. The HPFDIAGNOSE procedure automatically diagnoses the statistical characteristics of time series and identifies appropriate models. As an example, the models that HPFDIAGNOSE can consider for each time series could include ARIMAX, Exponential Smoothing, and Unobserved Components models. Log transformation and stationarity tests are automatically performed. The ARIMAX model diagnostics find the AR and MA orders, detect outliers, and select the best input variables. The Unobserved Components Model diagnostics find the best components and select the best input variables. The HPFDIAGNOSE program can be configured to provide the following functionality:

intermittency (or interrupted series) test
functional transformation test
simple differencing and seasonal differencing tests
tentative simple ARMA order identification
tentative seasonal ARMA order identification
outlier detection
significance test of events (indicator variables)
transfer function identification
   intermittency test
   functional transformation for each regressor
   simple differencing order and seasonal differencing order for each regressor
   time delay for each regressor
   simple numerator and denominator polynomial orders for each regressor
intermittent demand model (automatic selection)
exponential smoothing model (automatic selection)
unobserved components model (automatic selection)

The HPFENGINE procedure provides an automatic way to generate forecasts for many time series or transactional data in one step. The procedure can automatically choose the best forecast model from a user-defined model list. Specifications for the candidate forecast models are independent of any data series and can be generated by the user or chosen from a default set. Supported model families include: Smoothing; Intermittent Demand; Unobserved Component; and ARIMA. The HPFENGINE and HPFDIAGNOSE programs are discussed in U.S. Provisional Patent Application 60/679,093 filed May 9, 2005 entitled "Computer-Implemented Forecasting Systems And Methods," the entire document (e.g., specification, drawings, etc.) of which is herein expressly incorporated by reference.

The HPFEVENTS program generates dummies that are automatically extended, shortened, or changed as observations are added and deleted from a time series. Thus, a single EVENT definition can be used for several time series or for different spans of the same series. PROC HPFEVENTS can be used to define dummies that function equally well for time series of various intervals, for instance weekly or monthly data. The same EVENT definition can model daily data or weekly totals. EVENT definitions can be stored in a data set. EVENT definitions can later be changed, new EVENTS added, or additional dummies generated from an existing data set.

EVENT definitions stored in a data set can be passed directly to PROC HPFENGINE and PROC HPFDIAGNOSE. SAS predefined EVENT definitions can be accessed directly from PROC HPFENGINE and PROC HPFDIAGNOSE. PROC HPFEVENTS can generate a data set that can be used in other procedures such as PROC REG which module is available from the SAS Institute Inc. located in Cary, N.C.

PROC HPFEVENTS recognizes predefined variables and dates. Thus, events involving holidays such as Easter and Thanksgiving can be modeled easily, even though the dates of the events change from year to year. It provides results in output data sets that may be interpreted in other SAS procedures.

Figure 23:
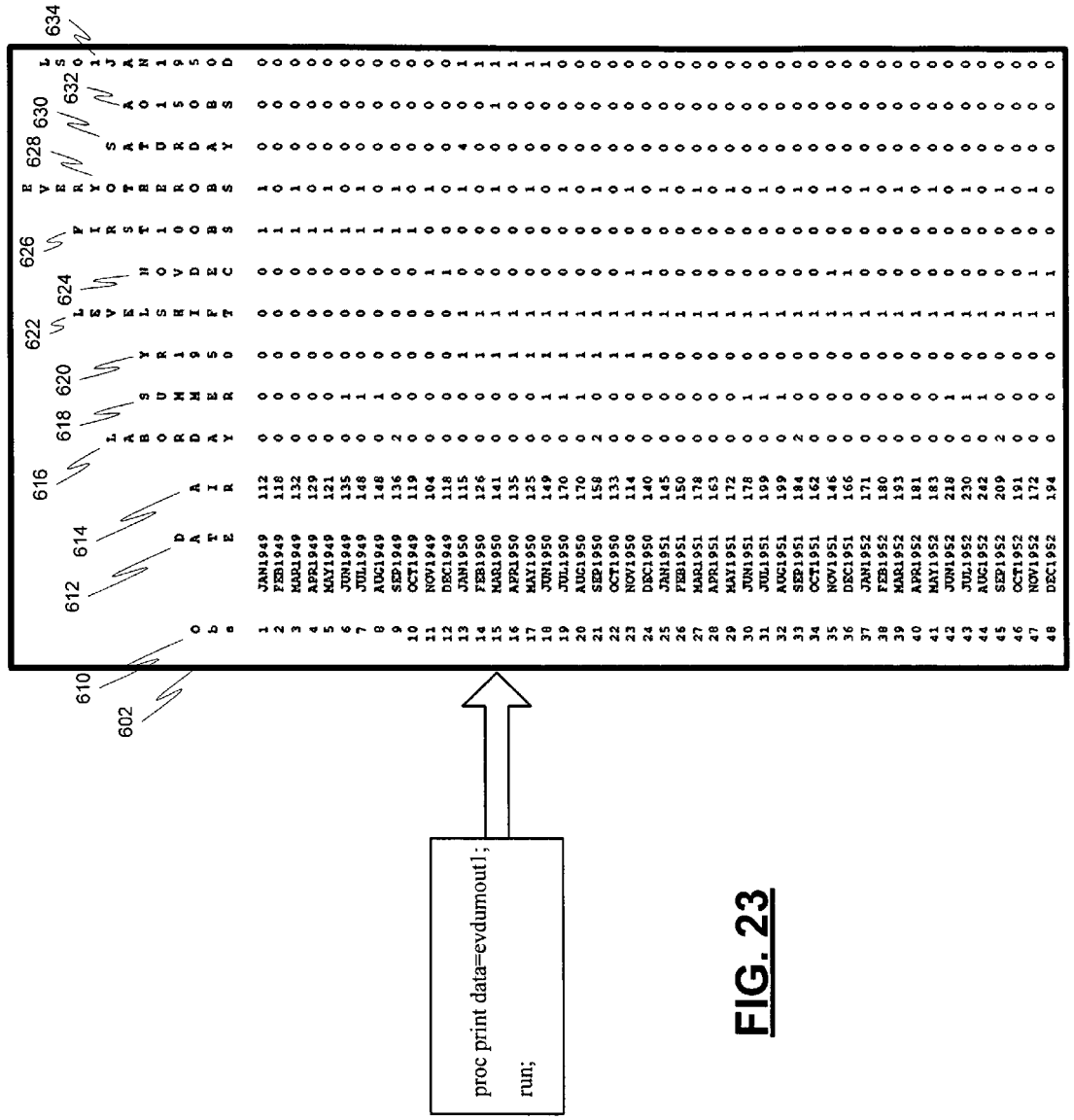
FIG. 23 depicts output of interpretation of an event into an event dummy data set.

FIG. 21 provides an example of PROC HPFEVENTS wherein the program is used to create events (e.g., Labor Day, Summer, etc.) and dummies and output the event definitions to a data set named EVDSOUT1 (see FIG. 21) and dummies to a data set named EVDUMOUT1 (see FIG. 21). With reference to the code of FIG. 21, line 500 identifies that PROC HPFEVENTS is to be used. The "data" term names the SAS data set containing the variables used in the VAR line 502 and ID line 504. The VAR statement 502 is used with PROC HPFEVENTS to copy input variables to the output dummy data set. The ID statement 504 names a numeric variable (e.g., "date" in this example) that identifies observations in the input and output data sets. The "air" variable (which represents airline sales data) is retrieved from the sashelp.air dataset and whose values are shown at various date values in column 614 in FIG. 23. As an illustration, the "air" variable value for observation #9 is the value 136 for the date value of September 1949. As defined by the ID statement 504, the date values have an interval of every month with an end date of Dec. 31, 1952. This is illustrated in FIG. 23 within the date column 612.

With reference to FIG. 21, EVENTDEF statements appear at lines 506, 508, 510, 512, 514, 516, 518, and 520. An EVENTDEF statement is used to define an event. Although an event occurs at one or more time values, the event definition is independent of the time ID; that is, the event is a function that operates on a time ID variable.

For example, a labor day event is created via the EVENTDEF statement 506 for the term "LABORDAY." PROC HPFEVENTS recognizes that "LABOR" is a date keyword. As shown in the labor day column 616 of FIG. 23, when PROC HPFEVENTS creates a dummy variable for this event, a timing value is generated for each Labor Day that falls in the span of the time, series. Each observation that matches the date of Labor Day has a value of 2. As an illustration, observation #9 in FIG. 23 shows a value of 2 for the date September 1949.

With reference to the event "SUMMER" defined at statement 508, the do-list, '01Jun1900'D to '01Jun2005'D by year, generates 106 timing values on the first of June for each year from 1900 to 2005. The pulse for each timing value will last for three observations, the observation matching June 1st and the two following. For monthly data, this should generate a pulse for June, July, and August of each year from 1900 to 2005. As an illustration, FIG. 23 shows that a value of one has been placed for June observation #18, July observation #19, and August observation #20 in Column 618. If you add PULSE=MONTH to this statement, then the EVENT always specifies June, July, and August, regardless of the interval of the data. The PULSE term specifies the interval to determine the width of the event. If you specify only the timing value '01Jun1900'D and add PERIOD=YEAR, then you have the same effect for all years, even years before 1900 and after 2005.

With reference to the event "YR1950" defined at statement 510 by specifying a timing value within the year 1950 and using PULSE=YEAR, this event is a pulse for any observations within the year 1950. This is illustrated on FIG. 23 in column 620 for observations #13-#24.

Because of the definition at statement 512, the event "LEVELSHIFT" (e.g., TYPE=LS) has, by default, AFTER= (DURATION=ALL). The pulse begins at the observation matching Jan. 1, 1950 (i.e., observation #13), and continues to the end of the series (i.e., observation #48). A special missing value of "A" is shown in the _DUR_AFTER_ variable of the events definition data set to represent AFTER= (DURATION=ALL).

The event NOVDEC is defined at statement 514. Here the date keyword CHRISTMAS is used. CHRISTMAS produces the same result as a timing value of '25Decyyyy'D and PERIOD=YEAR. The options BEFORE=(DURATION=1) and PULSE=MONTH specify the months of November and December for any year in the span of the series. This is illustrated on FIG. 23 in column 624 at observations #11 and #12. If the intent is to specify certain months of the year, this is preferable to the syntax used in SUMMER.

The event FIRST10OBS is defined at statement 516. The integers in a timing list specify observation numbers. This dummy is a pulse from observation 1 to observation 10, regardless of the value of the timing ID variable. This is illustrated on FIG. 23 in column 626 from observations #1 to #10.

The event EVERYOTHEROBS is defined at statement 518. Like FIRST10OBS, this dummy specifies every other observation starting at observation 1 and ending at observation 199. This is illustrated on FIG. 23 in column 628 for ever other observation from observations #1 to #48.

The event SATURDAY is defined at statement 520. WEEK.7 in the do-list specifies Saturday dates. The do-list produces timing values that are the Saturdays in January of 1950. This is illustrated on FIG. 23 in column 630 at observation #13. If the data is daily, there are 4 pulses in January of 1950, one on each Saturday. If the data is weekly, a pulse is formed for 4 successive observations in January of 1950. If the data is monthly and RULE=ADD, which is the default, then the observation for January 1950 counts the number of Saturdays in January.

The EVENTKEY term is used at statement 522. AO15OBS is a predefined event that means a pulse placed on the 15th observation. This is illustrated on FIG. 23 in column 632 at observation #15.

LS01JAN1950D used in statement 524 is recognized as an event keyword. LS01JAN1950D is a predefined event that means a level shift beginning at '01Jan1950'D. The qualifier AFTER=(DURATION=5) modifies the predefined event. This is illustrated on FIG. 23 in column 636 at observations #13 to #19.

The EVENTKEY GARBAGE at 526 is ignored as garbage because it is not an event keyword. A warning is printed to a log.

An EVENTDATA statement 528 is used to input events from an events data set and to output events to an events data set. Statement 528 generates an event definition data set showing variables related to event definitions. (The output is shown in FIG. 22.)

An EVENTDUMMY statement 530 is used to output dummy variables for events to a data set. Statement 530 generates the output shown in FIG. 23 which is an interpretation of an event into an event dummy data set.

The RUN statement 532 executes the procedure.

Figure 22:
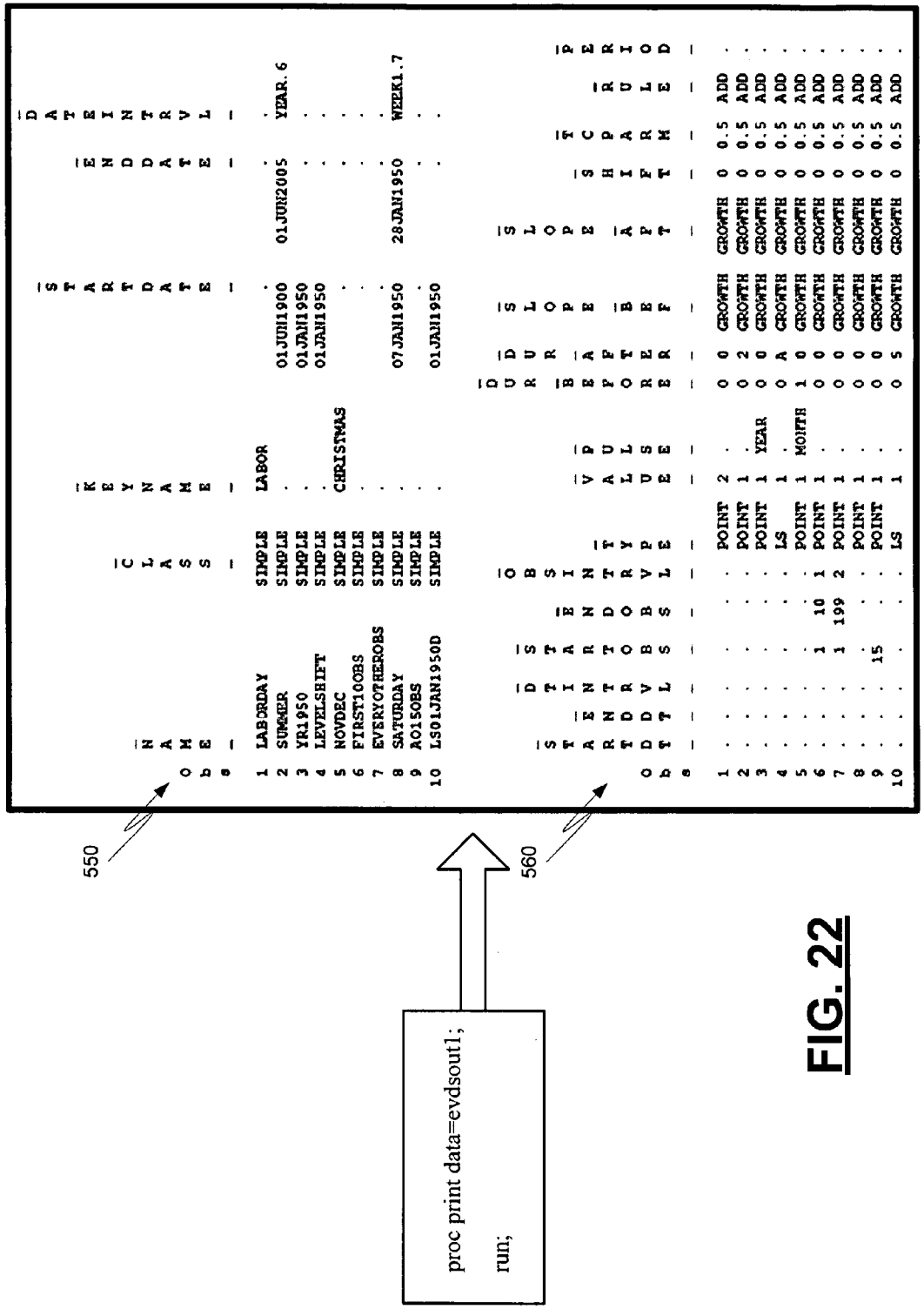
FIG. 22 depicts output of an event definition data set showing variables related to event definitions.

FIG. 22 shows a data set showing variables related to event definitions. At 550 and 560, the following columns are shown that describe attributes of the defined events: observation, name, class, keyname, start date, end date, date interval, startdt (e.g., this contains either the datetime timing value or the first datetime timing value to use in a do-list), enddt (e.g., this contains the last datetime timing value to use in a do-list), dtinterval (e.g., this contains the interval for the datetime do-list), start observation, end observation, observation interval, type, value, pulse, duration before, duration after, slope before, slope after, shift, tc parm, rule and period. As an illustration, the event labor day is the first observation and has the following attributes: "simple" class; "labor" keyname; "point" type; value of "2"; 0 duration before; 0 duration after; "growth" slope before; and "growth" slope after.

FIG. 23 shows an interpretation of an event into an event dummy data set 602 with the following columns: OBSERVATION column 610; DATE column 612; airline sales data column 614; LABORDAY column 616; SUMMER column 618; YR1950 column 620; LEVELSHIFT column 622; NOVDEC column 624; FIRST10OBS column 626; EVERYOTHEROBS column 628; SATURDAY column 630; AO15OBS column 632; and LS01JAN1950D column 634. Example values for these columns have been discussed in the example above.

Figure 25:
FIG. 25 illustrates the data being saved in a condensed format.

As another example, consider a set of EVENT definitions that has only a few variables that apply. Code for this example is shown in FIG. 24. Statement 700 identifies that PROC HPFEVENTS is to be used with the dataset "sashelp.air" that contains a time series of airline sales time data. The ID statement 702 names a numeric variable (e.g., "date" in this example) that identifies observations in the input and output data sets. The code reads the event definition data set (as defined in the above example) and saves in a condensed format. FIG. 25 illustrates the data being saved in a condensed format. As an illustration of the use of the condensed format, consider that in the previous example, no datetime timing values are specified, so the variables _STARTDT_, _ENDDT_, and _DTINTRVL_ have all missing values. In such a case, the user can specify the CONDENSE option in the EVENTDATA statement, and PROC HPFEVENTS automatically determines if any variables in the EVENT definition data set contain only the default values; those variables are not included in the output data set. In addition to the missing datetime values the variables _SLOPE_BEF_, _SLOPE_AFT_, _TCPARM, RULE_ and _PERIOD_ also contain default values and are omitted in this example from the condensed data set. When PROC HPFEVENTS reads a data set, any variables not in the data set are automatically set to the default value. Thus, it is not necessary to specify CONDENSE when using the EVENTDATA IN=option. PROC HPFEVENTS automatically reads condensed data sets.

FIG. 26 illustrates that a wide assortment of statements 800 and options (802, 804, and 806) can be used with the HPFEVENTS procedure. The procedure can have the following structure:

PROC HPFEVENTS options;
   VAR variables;
   BY variables;
   ID variable INTERVAL=interval options;
   EVENTDEF variable=do-list/options;
   EVENTKEY <variable=> predefined-event-keyword/options;
   EVENTCOMB variable=variable-list/options;
   EVENTGROUP <variable=> predefined-event-keyword;
   EVENTGROUP variable=variable-list;
   EVENTDATA options;
   EVENTDUMMY options;

The statements and options controlling the HPFEVENTS procedure are summarized in the table of FIG. 26.

The following options can be used in the PROC HPFEVENTS statement:

DATA=SAS-data-set
   names the SAS data set containing the variables used in the VAR, ID, and BY statements. If the DATA=option is not specified, the most recently created SAS data set is used.

LEAD=n
   specifies the number of periods to extend the dummy variable beyond the time series. The default is LEAD=0. The LEAD=value is relative to the last observation in the input data set and not to the last nonmissing observation of a particular series. Thus, if a series has missing values at the end, the actual number of dummy values beyond the last nonmissing value will be greater than the LEAD=value.

MAXERROR=number
  limits the number of warning and error messages produced during the execution of the procedure to the specified value. The default is MAXERROR=25. This option is useful in BY-group processing where it can be used to suppress the recurring messages.

SORTNAMES
  specifies that the events and variables in the output data sets are printed in alphabetical order.

A BY statement can be used with PROC HPFEVENTS to obtain separate dummy variable definitions for groups of observations defined by the BY variables.

The ID statement names a numeric variable that identifies observations in the input and output data sets: ID variable INTERVAL=interval options;

The ID variable's values are assumed to be date, time, or datetime values. In addition, the ID statement specifies the (desired) frequency associated with the actual time series. The information specified affects all dummy variables output using the EVENTDUMMY statements. If no dummy variables are requested, the ID statement has no impact on processing, since the EVENTDEF definitions are independent of the time identification values of a time series. If the ID statement is specified, the INTERVAL=option is also be specified. If an ID statement is not specified, the observation number, with respect to the BY-group, is used as the time ID. When the observation number is used as the time ID, only EVENT timing values that are based on observation numbers are applied to the time series to create dummy variables; timing values based on SAS date or datetime values are ignored. The following options can be used with the ID statement:

ALIGN=option
  controls the alignment of SAS dates used to identify output observations. The ALIGN=option accepts the following values: BEGINNING|BEG|B, MIDDLE|MID|M, and ENDING|END|E. BEGINNING is the default.

END=option
  specifies a SAS date, datetime, or time value that represents the end of the data. If the last time ID variable value is less than the END=value, the series is extended with missing values. If the last time ID variable value is greater than the END=value, the series is truncated. For example, END="&sysdate"D uses the automatic macro variable SYSDATE to extend or truncate the series to the current date. This option and the START=option can be used to ensure that data associated with each BY-group contains the same number of observations.

INTERVAL=interval
  specifies the frequency of the input time series. For example, if the input data set consists of quarterly observations, then INTERVAL=QTR should be used.

SETMISSING=option|number
  specifies how missing values are assigned in the time series copied to the dummy data set when there is no observation matching the time ID in the input data set. If a number is specified, missing values are set to number. If a missing value indicates an unknown value, this option should not be used. If a missing value indicates no value, a SETMISSING=0 should be used. You would typically use SETMISSING=0 for transactional data because no recorded data usually implies no activity. The following options can also be used to determine how missing values are assigned:

MISSING:
  Missing values are set to missing. This is the default option.

SKIP:
  If the observation for the time ID value is missing in the input data set, then the corresponding observation is skipped in the dummy data set. This option may be useful if dummies are to be used as predictor values and you wish apply the PROC HPFENGINE ACCUMULATE option to the dummy data.

START=option
  specifies a SAS date, datetime, or time value that represents the beginning of the data. If the first time ID variable value is greater than the START=value, the series is prepended with missing values. If the first time ID variable value is less than the START=value, the series is truncated. This option and the END=option can be used to ensure that data associated with each by group contains the same number of observations.

An EVENTDEF statement can be used with PROC HPFEVENTS to define an event: EVENTDEF: SAS-variable-name=timing-value-list/qualifier options;

Although an event occurs at one or more time values, the event definition is independent of the time ID; that is, the event is a function that operates on a time ID variable. Once defined, the event can be output using the OUT=option of the EVENTDATA statement. A dummy variable for the event can be output using the OUT=option of the EVENTDUMMY statement. The dummy variable can be created by evaluating the event with respect to the time ID. If a time ID is not specified using the ID statement, then the BY-group observation number is used as the time ID. More than one EVENTDEF statement can be specified. Once defined, an event will be referenced using its variable-name. When the event is output using the EVENTDATA statement, the event will be identified by its variable-name. When a dummy is created using the event definition, the dummy variable name will be the same as the event SAS-variable-name.

Each event has a unique variable-name. If two event definitions have the same name, the following rules apply. If two EVENTDEF statements exist using the same name, the later statement is used. If an event is defined in both an EVENTDEF statement and in a data set specified using the EVENTDATA statement, the definition in the EVENTDEF statement is used. Any event defined using an EVENTDEF or EVENTDATA statement is used rather than a SAS predefined event.

Each EVENTDEF statement is defined using one or more event timing values. The timing values may be specified using a list. Each item in the list may be a SAS date keyword, an integer, a SAS-date, a SAS-datetime, or a do-list. For example, the EVENTDEF statement below specifies timing values using each of these methods in the order listed:

EVENTDEF EVENT1=USINDEPENDENCE 10
  '25Dec2000'D
  '01Mar1990:15:03:00'DT
  '01Jan2000'D to '01Mar2000'D by month;

The timing values are interpreted as: any July 4 in the series; the 10th observation; Dec. 25, 2000; Mar. 1, 1990 at 3:03 PM; Jan. 1, 2000; Feb. 1, 2000; and Mar. 1, 2000. The following two EVENTDEF statements specify identical timing values:

EVENTDEF MYFIRSTEVENT='01Jan2000'D to '01Mar2000'D by month; EVENTDEF MYNEXTEVENT=('01Jan2000'D, '01Feb2000'D, '01Mar2000'D);

The timing value list may be enclosed in parentheses, and commas may separate the items in the list. Numbers are interpreted as observation numbers. The do-list may be based on observation numbers, SAS-dates, or SAS-datetimes. However, the first and second values in the list are of the same type. The SAS grammar expects the type of the second value to be the same as the type of the first value, and tries to interpret the statement in that fashion.

The table in FIG. 27 shows an example of holiday date keywords and definitions that can be used in a timing value list and their definitions. The date of Easter is calculated using a method described by (Montes 2001b). The table in FIG. 28 shows an example of seasonal date keywords that can be used in a timing value list and their definitions.

When dummies are created, each timing value is evaluated with respect to the time ID.

The event timing value(s) should be consistent with the time ID. In particular, date and datetime timing value(s) are ignored when the time ID is based on the observation number.

Figure 29:
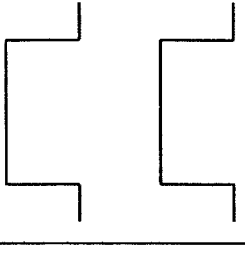

The qualifier options define a function to be applied at each timing value. The following qualifier options can be used with the EVENTDEF statement:

TYPE=option
  specifies the type of event variable. Each type uses a different formula to create the dummy variables. The formula for each TYPE=option is dependent on the other qualifiers that are specified in the EVENTDEF options. The formula is applied to each timing value specified in the timing-value list. The TYPE=option accepts the following values: POINT|LS|RAMP|TR|TEMPRAMP|TC|LIN|LINEAR|QUAD|CUBIC|INV|INVERSE|LOG|LOGARITHMIC. The table in FIG. 29 illustrates the basic shape for each TYPE=value. POINT is the default type.
  The table in FIGS. 13 and 14 shows the formula used for each type of event when the event extends infinitely both before and after the timing value. The table in FIGS. 15-17 shows the formula used for each type of event for finite duration values. In the formulas, $t_i$ is the observation specified by the ith timing value in the timing value list, VALUE=v, TCPARM=$\phi$, AFTER=(DURATION=n SLOPE=$s_a$), BEFORE=(DURATION=m SLOPE=$s_b$), and PULSE=interval. The table in FIG. 12 shows how to calculate $t_b$ and $t_e$, which are based on the DURATION=values. The terms $t_b$ and $t_e$ are the beginning and ending observations of the event definition. (For TYPE=RAMP, the ramp persists past the top of the ramp.)

VALUE=number
  specifies the event indicator value, v. The default event indicator value is one (v=1.0). The table 5 in FIGS. 15-17 provides details about the effect of the event indicator value on the dummy variables. However, for TYPE=POINT|LS|RAMP|TR|TC events consisting of a single timing value with finite duration, the user can think of the event indicator value as the maximum amplitude: the values of the dummy should be bounded below by zero and above by the event indicator value. For trend events (TYPE=LINEAR|QUAD|CUBIC|INV|LOG), the event indicator value is the coefficient of the term.

SHIFT=number
  specifies the number of pulses to shift the timing value, $\delta$. The default is not to shift the timing value ($\delta$=0).

When the SHIFT=option is used, all timing values in the list, including those generated by date keywords will be shifted. Thus, SHIFT=may be used with EASTER to specify Ecclesiastical Holidays which are based on Easter. For example,
EVENTDEF GoodFriday=EASTER/SHIFT=−2 PULSE=DAY;
  specifies Good Friday, which is defined as 2 days before Easter (Montes 2001a).

PULSE=interval
  specifies the interval to be used with the DURATION=option to determine the width of the event. The default pulse is one observation. When no DURATION=values are specified, and the PULSE=option is specified, the DURATION=values will be set to zero.

BEFORE=(option-list) and AFTER=(option-list)
  specify options that control the event definition before and after the timing value. The DURATION=and SLOPE=options are used within the parentheses in the BEFORE=( ) and AFTER=( ) options. The SLOPE=option is ignored if the corresponding DURATION=0.

DURATION=number
  specifies the event duration before the timing value when used in the BEFORE=( ) option or after the timing value when used in the AFTER=( ) option. The event always occurs at the timing value. You would specify 3 observations before, 1 observation at the timing value, and 4 after the timing value for a total of 3+1+4=8 observations as follows: EVENTDEF E1='01JAN1950'D/BEFORE=(DURATION=3) AFTER=(DURATION=4); You would specify 3 weeks before, the week of the timing value, and 4 weeks after the timing value using a combination of the BEFORE=, AFTER=, and PULSE=options as follows:
  EVENTDEF E1='01JAN1950'D/BEFORE=(DURATION=3) AFTER=(DURATION=4) PULSE=WEEK;

DURATION=ALL
  implies that the event should be extended to the beginning (BEFORE=) or end (AFTER=) of the series. If only one DURATION=value is specified, the other value is assumed to be zero. When neither DURATION=value is specified, and the PULSE=value is specified, both DURATION=values are set to zero. When neither DURATION=value is specified, and the PULSE=value is not specified, then both DURATION=values are assigned default values based on the TYPE=option. For polynomial trend events (TYPE=LINEAR|QUAD|CUBIC), the default DURATION=value is ALL for both the BEFORE=( ) option and the AFTER=( ) option. For other events, the default value for the BEFORE=( ) option is always zero, and the default event duration for the AFTER=( ) option depends on the TYPE=option. The table in FIGS. 29 and 30 shows default duration values by TYPE=value and how the basic event shape depends on the duration value. DURATION=ALL is represented in the event definition data set as a special missing value displayed as "A".

SLOPE=option
  specifies whether a ramp or temporary change type is growth or decay. SLOPE is ignored unless TYPE=RAMP, TYPE=TR, TYPE=TEMPRAMP, or TYPE=TC. SLOPE=is also ignored if the corresponding DURATION=0. The SLOPE=value in the BEFORE=option controls the slope before the timing value and the SLOPE=value in the AFTER=option controls the slope after the timing value. The SLOPE=option accepts the values: GROWTH|DECAY. GROWTH is the default. The following statement:

EVENTDEF E1='01JAN1950'D/BEFORE=(DURATION=3 SLOPE=GROWTH) AFTER=(DURATION=4 SLOPE=DECAY) TYPE=RAMP;

specifies a ramp up, followed by a ramp down. The event dummy observations immediately preceding the timing value contain the following values: 0, $$\frac{1}{3}, \frac{2}{3}.$$

The observation at the timing value has a value of 1. The observations immediately after the timing value are $$\frac{3}{4}, \frac{2}{4}, \frac{1}{4},$$

0.

TCPARM=number
specifies a parameter $0 \leq \phi \leq 1$ used in the growth/decay equation for TYPE=TC given in the table 5 of FIGS. 13 and 14. The TCPARM=value is the rate of growth or decay. A larger TCPARM=value causes faster growth or decay. TCPARM is ignored unless TYPE=TC. The default value is 0.5.

RULE=
specifies the action to take when the defined event has multiple timing values which overlap. The RULE=option accepts the following values: ADD|MAX|MIN|MINNZ|MINMAG. ADD is the default. The table in FIG. 31 explains how the RULE=option is interpreted when the value for an observation is defined by multiple timing values. Because the range of the event associated with a timing value may not include the all the observations in the series, RULE=may be interpreted differently when using multiple timing values in one EVENTDEF statement versus defining a combination event using the EVENTCOMB statement. Thus, the dummy variables TWOTIMING and TWOEVENTS defined in the following statements are different:

eventdef xmasrp=CHRISTMAS/BEFORE= (SLOPE=GROWTH DURATION=3) TYPE=RAMP RULE=MIN;
eventdef easterrp=EASTER/BEFORE= (SLOPE=GROWTH DURATION=3) TYPE=RAMP RULE=MIN;
eventdef twotiming=EASTER CHRISTMAS/BEFORE=(SLOPE=GROWTH DURATION=3) TYPE=RAMP RULE=MIN;
eventcomb twoevents=easterrp xmasrp/RULE=MIN;

PERIOD=interval
specifies the interval for the frequency of the event. For example, PERIOD=YEAR should produce a dummy value that is periodic in a yearly pattern. If the PERIOD=option is omitted, the event is not periodic. The PERIOD=option also does not apply to observation numbers, which are not periodic, or to date keywords, which have their own periodicity.

LABEL='SAS-label'
specifies a label for the dummy variable for this event. 'SAS-label' is a quoted text string of up to 256 characters. The default label is: "Dummy Variable for Event <variable-name>" where <variable-name> is the name specified in the EVENT statement.

An EVENTKEY statement can be used with PROC HPFEVENTS to make a SAS predefined event available for processing:

EVENTKEY <variable=> predefined-event-keyword/options;

The EVENTKEY statement will construct a SAS simple EVENT for each SAS predefined event keyword. The SAS predefined events are also available directly through PROC HPFDIAGNOSE and PROC HPFENGINE. Each EVENTKEY variable has a predefined set of timing values and qualifiers associated with the predefined event keyword. The options are the same as in the EVENTDEF statement and can be used to redefine the qualifiers associated with the predefined event. The default variable name for the predefined event is the predefined event keyword. However, the user can specify a variable name for the event. For example, you can rename the CHRISTMAS predefined EVENT to XMAS using the following statement:

EVENTKEY XMAS=CHRISTMAS;

If the user redefines the qualifiers associated with a SAS predefined EVENT and does not rename the event, then that has the impact of redefining the SAS predefined event, since any user definition takes precedence over a SAS predefined definition. The following example produces an event FALLHOLIDAYS with a pulse of 1 day at Halloween and a pulse of 1 month at Thanksgiving.

EVENTKEY THANKSGIVING/PULSE=MONTH;
EVENTCOMB FALLHOLIDAYS=HALLOWEEN THANKSGIVING;

SAS predefined events are based on either a SAS date keyword or an additive outlier or level shift based on a timing value. The table in FIG. 32 describes how to construct a SAS predefined event keyword. It also gives the default qualifier options for those predefined events.

The table in FIG. 27 shows the date keywords that can be used as SAS predefined event keywords and their definitions. The table in FIG. 28 shows the seasonal keywords that can be used as SAS predefined event keywords and their definitions. The table in FIG. 33 gives a more detailed description of how date and observation numbers are encoded into AO and LS type predefined events.

An EVENTCOMB statement can be used with PROC HPFEVENTS to create a new event from one or more events that have previously been defined:

EVENTCOMB variable=variable-list/options;

The following options can be used with the EVENTCOMB statement.

RULE=
specifies the action to take when combining events. The RULE=option accepts the following values: ADD|MAX|MIN|MINNZ|MINMAG. ADD is the default. The table in FIG. 31 explains how the RULE=option is interpreted.

An EVENTGROUP statement can be used with PROC HPFEVENTS to create an event group or make a predefined event group available for processing:

EVENTGROUP <variable=> predefined-eventgroup-keyword;
EVENTGROUP variable=variable-list;

The EVENTGROUP statement will construct a SAS complex EVENT. A complex EVENT is an event which is represented by multiple dummy variables. For example, seasonal effects usually require multiple dummy variables. The SAS predefined event groups are also available directly through PROC HPFENGINE. Each EVENTGROUP predefined group keyword has a predefined set of event keywords associated with the predefined group. The default variable name for the predefined event is the predefined event keyword. However, the user can specify a SAS variable name for the event. For example, you can rename the DAYS predefined EVENT group to TD using the following statement:

EVENTGROUP TD=DAYS;

The table in FIG. 34 describes the SAS predefined event group keywords. The SEASONAL group is a PREDEFINED COMPLEX EVENT; the SEASONAL group is interpreted to be one of the other SEASONAL groups at the time that dummy variables are created based on the ID statement. The ID statement could be the ID statement associated with either PROC HPFEVENTS or PROC HPFENGINE.

The table in FIG. 32 provides more detail on the seasonal and trend SAS predefined EVENTS that are compose the EVENT groups.

An EVENTDATA statement can be used with PROC HPFEVENTS to input events from an events data set and to output events to an events data set:

EVENTDATA options;

Either the IN= or the OUT= option are specified. The following options can be used with the EVENTDATA statement:

IN=SAS-data-set
  names an input data set that contains event definitions to be used in the PROC HPFEVENTS procedure.
OUT=SAS-data-set
  names the output data set to contain the event definitions as specified in the EVENTDATA IN= data sets and the EVENTDEF, EVENTKEY, EVENTGROUP and EVENTCOMB statements. The OUT= data set can then be used in other SAS procedures to define events.
CONDENSE
  specifies that the EVENTDATA OUT= data set is condensed; any variables that contain only default values are omitted from the data set. The EVENTDATA IN= option reads both condensed data sets and data sets that have not been condensed. For more details, see "EVENTDATA OUT Data Set".

An EVENTDUMMY statement can be used with PROC HPFEVENTS to output dummy variables for events to a data set. Options can be specified as follows with an EVENTDUMMY:

EVENTDUMMY options;

The OUT= option should be specified. The following option can be used with the EVENTDUMMY statement:

OUT=SAS-data-set
  names the output data set to contain the dummy variables for the specified events based on the ID information as specified in the ID statement. The OUT data set also includes variables as specified in the VAR, BY, and ID statements.

A VAR statement can be used with PROC HPFEVENTS to copy input variables to the output dummy data set:

VAR variables;

Numeric variables are specified. If the VAR statement is omitted, all numeric variables are selected except those appearing in a BY or ID statement.

When the EVENTDUMMY statement is used to create dummy variables, you may need to specify the handling of missing observations in the input data set, that is, where the observation corresponding to a time ID is missing from the data set. In that case, the input data set does not contain a value for the variables to be copied to the EVENTDUMMY OUT= data set. Sometimes missing values should be interpreted as unknown values. The forecasting models used by the HPFENGINE procedure can effectively handle missing values (see Chapter 16, "The HPFENGINE Procedure" of the above-referenced 60/679,093 provisional application). In this case, SETMISSING=MISSING can be used. But sometimes missing values are known, such as when no observations should be interpreted as no (zero) value. In this case, the SETMISSING=0 option should be used. In other cases, missing time IDs should be skipped, such as when the data is to be accumulated at a later time. In this case, SETMISSING=SKIP should be used.

The HPFEVENTS procedure can create the EVENTDATA OUT and EVENTDUMMY OUT= data sets. The EVENTDATA OUT= data set contains the EVENT definitions that may be used for input to another SAS procedure. The EVENTDUMMY OUT= data set contains the variables listed in the BY statement, the ID variable, any variables defined by the VAR statement, and any dummy variables generated by the procedure.

The EVENTDATA OUT= data set contains the variables listed below. The default values for the CONDENSE option are also given. (When all the observations in the variable are equal to the default value, the variable can be omitted from the event definition data set.)

_NAME_
  EVENT variable name. The _NAME_ variable is required; there is no default.
_CLASS_
  Class of EVENT: SIMPLE, COMBINATION, PREDEFINED. The default for _CLASS_ is SIMPLE.
_KEYNAME_
  Contains either a date keyword (SIMPLE EVENT) or a predefined EVENT variable name (PREDEFINED EVENT) or an event name (COMBINATION event or an event name (GROUP event)). The default for _KEYNAME_ is no keyname, designated by ".".
_STARTDATE_
  Contains either the date timing value or the first date timing value to use in a do-list. The default for _STARTDATE_ is no date, designated by a missing value.
_ENDDATE_
  Contains the last date timing value to use in a do-list. The default for _ENDDATE_ is no date, designated by a missing value.
_DATEINTRVL_
  Contains the interval for the date do-list. The default for _DATEINTRVL_ is no interval, designated by ".".
_STARTDT_
  Contains either the datetime timing value or the first datetime timing value to use in a do-list. The default for _STARTDT_ is no datetime, designated by a missing value.
_ENDDT_
  Contains the last datetime timing value to use in a do-list. The default for _ENDDT_ is no datetime, designated by a missing value.
_DTINTRVL_
  contains the interval for the datetime do-list. The default for _DTINTRVL_ is no interval, designated by ".".
_STARTOBS_
  Contains either the observation number timing value or the first observation number timing value to use in a do-list. The default for _STARTOBS_ is no observation number, designated by a missing value.

_ENDOBS_
Contains the last observation number timing value to use in a dolist. The default for _ENDOBS_ is no observation number, designated by a missing value.

_OBSINTRVL_
Contains the interval length of the observation number do-list. The default for _OBSINTRVL_ is no interval, designated by ".".

_TYPE_
Type of EVENT. The default for _TYPE_ is POINT.

_VALUE_
Value for nonzero observation. The default for _VALUE_ is 1.0.

_PULSE_
INTERVAL that defines the units for the DURATION values. The default for _PULSE_ is no interval, designated by ".".

_DUR_BEFORE_
Number of durations before the timing value. The default for _DUR_BEFORE_ is 0.

_DUR_AFTER_
Number of durations after the timing value. The default for _DUR_AFTER_ is 0.

_SLOPE_BEFORE_
For TYPE=RAMP, TYPE=RAMPP, and TYPE=TC, this determines whether the curve is GROWTH or DECAY before the timing value. The default for _SLOPE_BEFORE_ is GROWTH.

_SLOPE_AFTER_
For TYPE=RAMP, TYPE=RAMPP, and TYPE=TC, this determines whether the curve is GROWTH or DECAY after the timing value. The default for _SLOPE_AFTER_ is GROWTH.

_SHIFT_
Number of PULSE=intervals to shift the timing value. The shift may be positive (forward in time) or negative (backward in time). If PULSE=is not specified, then the shift is in observations. The default for _SHIFT_ is 0.

_TCPARM_
Parameter for EVENT of TYPE=TC. The default for _TCPARM_ is 0.5.

_RULE_
Rule to use when combining events or when timing values of an event overlap. The default for _RULE_ is ADD.

_PERIOD_
Frequency interval at which the event should be repeated. If this value is missing, then the event is not periodic. The default for _PERIOD_ is no interval, designated by ".".

The following example illustrates how the HPFEVENTS procedure interprets multiple timing values that overlap as well as the results of the same timing values used in separate EVENTDEF statements that are combined using EVENTCOMB (e.g., use of multiple timing values in a single event vs. using multiple events and the EVENTCOMB statement). Airline sales data is used for this illustration.

Figure 36:
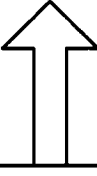
FIG. 36 depicts output showing multiple timing values versus multiple events.

The code in FIG. 35 defines a ramp for Christmas for observations 9 through 14. When XMASRP is evaluated, the undefined values in observations 1 through 8 are replaced with zeroes. The ramp for Easter is defined for the entire time series, as shown in the variable EASTERRP. When both timing values are used in one EVENTDEF statement for variable TWOTIMING, the values from the Easter ramp are used in observations 1 through 8, and the RULE=MIN is applied to observations 9 through 14. For the EVENTCOMB statement that defines the variable TWOEVENTS, the RULE=MIN option applies to all observations in the series. The output shown in FIG. 36 depicts multiple timing values versus multiple events.

As another example, the following example uses the DATA step to automatically construct potential outliers related to the price data found in the data set SASHELP.PRICEDATA. The following code is executed as a first step:

```
data orders(keep=date region line product sale);
    set SASHELP.PRICEDATA;
    format date monyy;
run;
```

The following SAS code constructs an EVENTDATA IN=data set for potential outliers (identified as sale >450). Only the _NAME_ and _STARTDATE_ variable are needed.

```
data outliers(keep=_NAME_ _STARTDATE_);
    set orders;
    if (sale >450) then do;
        _NAME_=trim('AO')||trim(left(put(YEAR(date),
            8.)))||'_'||trim(left(put(MONTH(date),8.)));
        _STARTDATE_=date;
    end;
    else delete;
    format _STARTDATE_ monyy;
run;
```

Next, an identification is done as to which outliers apply to each product.

```
data product_event_list (keep=region line product _
    NAME_);
    set orders;
    if (sale >450) then do;
        _NAME_=trim('AO')||trim(left(put(YEAR(date),
            8.)))||'_'||trim(left(put(MONTH(date),8.)));
    end;
    else delete;
run;
```

The potential outliers in the data set OUTL_REG1_LINE1_PROD1 apply to Region 1, Line 1, and Product 1.

```
data outl_reg1_line1_prod1;
    set product_event_list;
    if ((region ~=1)|(line ~=1)|(product ~=1)) then delete;
run;
```

Dummy variables are created and duplicate outlier events are eliminated from the events definition data set.

```
proc hpfevents data=orders;
    id date interval=month;
    by region line product;
    eventdata in =outliers;
    eventdata out=outidatabase (label='outlier definitions')
        condense;
    eventdummy out=dummies (label='dummy variables');
run;
```

Examining the data set OUTL_REG1_LINE1_PROD1 (depicted in FIG. 37) shows that we might want to look for outliers for May 1998, October 1999, March 2000, February 2001, June 2001, and September 2002.

PROC HPFEVENTS produced this data set (depicted in FIG. 38), which is condensed and has the duplicate events eliminated.

There is a selection of the observations related to Region 1, Line 1, Product 1 and scaling of the dummies that apply so that they are visible when plotted with the original data via the following code:

```
data pid1;
    set dummies;
```

```
if ((region ~=1)|(line ~=1)|(product ~=1)) then delete; else
    do;
    AO1998_5=100*AO1998_5;
    AO1999_10=100*AO1999_10;
    AO2000_3=100*AO2000_3;
    AO2001_2=100*AO2001_2;
    AO2001_6=100*AO2001_6;
    AO2002_9=100*AO2002_9;
end;
run;
```

PROC GPLOT is used to visually verify that these potential outliers are appropriate for the original data.

```
axis2 label=(angle=90 'time series data for decomposi-
    tion');
symbol1 i=join v='star' c=black;
symbol1 i=join v='circle' c=red;
legend1 label=none value=('Dummy for Event AO1998_
    5'
    'Dummy for Event AO1999_10'
    'Dummy for Event AO2000_3'
    'Dummy for Event AO2001_2'
    'Dummy for Event AO2001_6'
    'Dummy for Event AO2002_9'
    'Amount of Sales');
proc gplot data=pid1;
    plot AO1998_5*date=2
    AO1999_10*date=2
    AO2000_3*date=2
    AO2001_2*date=2
    AO2001_6*date=2
    AO2002_9*date=2
    sale*date=1/overlay legend=legend1 vaxis=axis2;
run;
```

Figure 39:
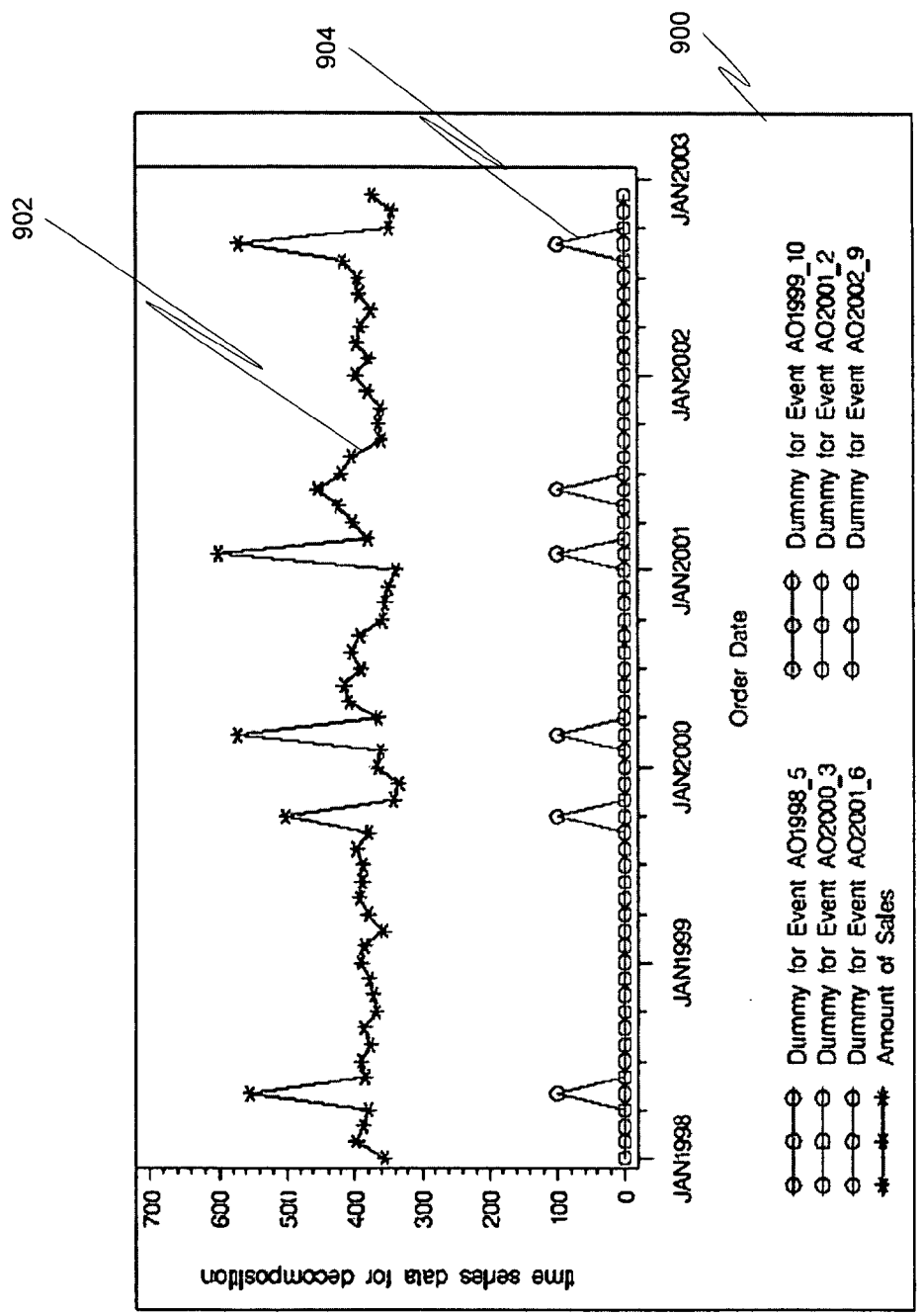
FIG. 39 is a graph for examining amount of sales data and dummy data over a period of time.

The graphical results of running this code are shown in FIG. 39. The plot 900 contains a graph of the amount of sales 902 and the dummy 904 over a period of time. The period of time in this example is from January 1998 to January 2003.

The following example illustrates how a data set is prepared for PROC HPFENGINE as well as how the HPFEVENTS procedure can be used to include events in the automatic forecasting of time series data. The code in FIG. 40 makes the data set via the statements at 1000 and alters the data by adding a levelshift of 100 beginning at October, 1980. At 1002, PROC HPFEVENTS is used to create an event named PROMOTION as a level shift occurring at Oct. 1, 1980. At 1004 and 1006, model specifications are created through PROC HPFARIMASPEC. The HPFARIMASPEC procedure is used to create an ARIMA model specification file. The output of this procedure is an XML file that stores the intended ARIMA model specification. This XML specification file can be used for different purposes; for example, to populate the model repository used by the HPFENGINE procedure. You can specify very general ARIMA models using this procedure. In particular, any model that can be analyzed using the ARIMA procedure can be specified. Moreover, the model specification can include series transformations such as log or Box-Cox transformations. The procedure is discussed further in of the above-referenced 60/679,093 provisional application.

At 1008, the HPFSELECT procedure is used to make a model selection list. The HPFSELECT procedure enables you to control the forecasting model selection process by defining lists of candidate forecasting models. Using model selection lists created by HPFSELECT, you can control which forecasting model or models are used to forecast particular time series. The HPFSELECT procedure creates model selection files and stores them in a repository for later use by the HPFENGINE procedure. (The procedure is discussed further in of the above-referenced 60/679,093 provisional application.) These model selection files list model specifications previously created and stored in a model repository by the HPFARIMASPEC, HPFESMSPEC, HPFEXMSPEC, HPFIDMSPEC, or HPFUCMSPEC procedures.

Figure 41:
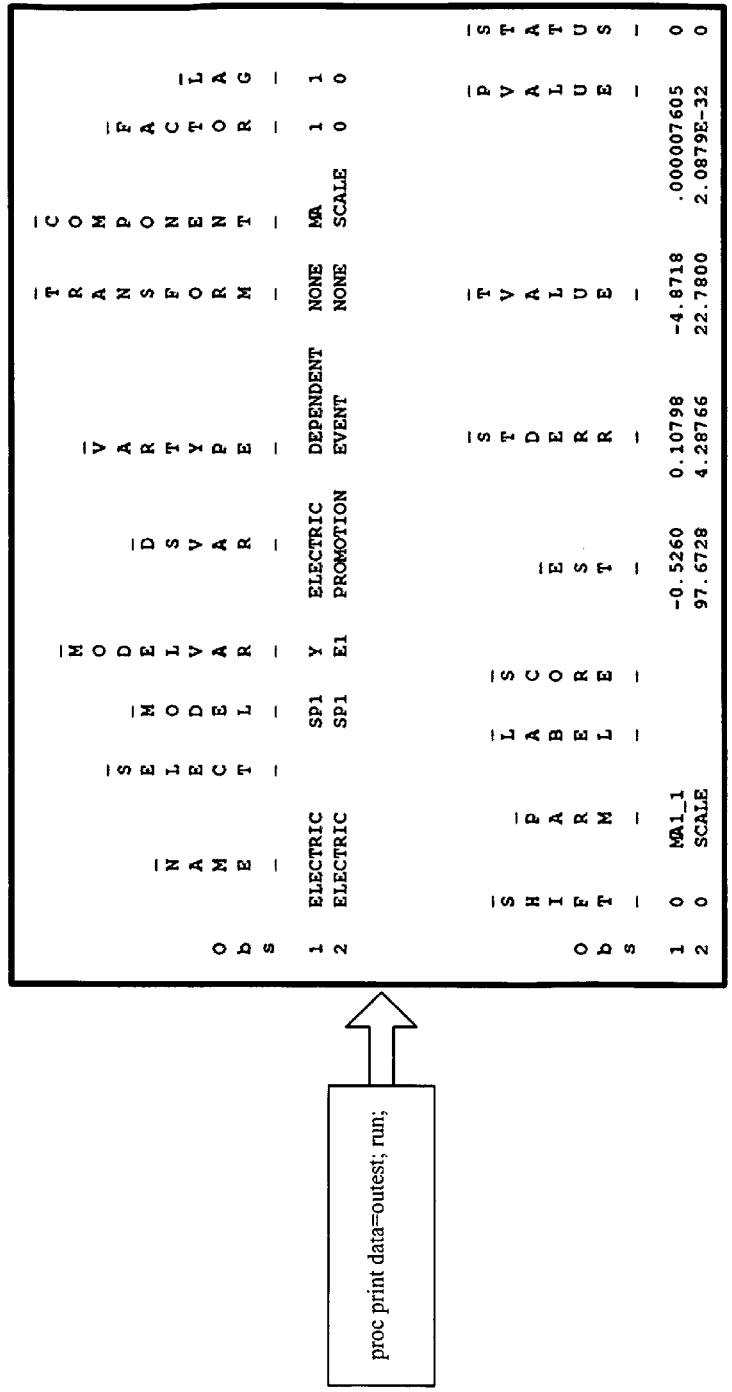
FIG. 41 depicts results of a model selection process.

At 1010, the HPFENGINE procedure is used to select a model to forecast for the electric variable. The results of the model selection using events are shown in FIG. 41. The output shows that PROC HPFENGINE has identified the parameter of the event PROMOTION as 97.6728, which is used in conjunction with the model named SP1 described as "ARIMA(0, 1, 1) No Intercept" to describe the forecasted variable electric.

In this example (whose code is shown in FIG. 40), the user can use the EVENTS system directly without using PROC HPFEVENTS. Instead of creating an event named PROMOTION, the user can use the SAS predefined event keyword LS01OCT1980D. The following example uses the data set generated from the code of FIG. 40 and the EVENT statement in PROC HPFDIAGNOSE to illustrate this method.

The code for this example is shown in FIG. 42. The data set is created at 1050 and the HPFDIAGNOSE procedure provides a forecast for the variable electric. The output in FIG. 43 from PROC HPFDIAGNOSE shows that a model was selected that included the level shift occurring at October 1980.

The following example illustrates how the HPFEVENTS procedure can be used to create dummies. With reference to the code of FIGS. 44 and 45, line 1100 identifies that PROC HPFEVENTS is to be used. The "data" term names the SAS data set containing the variables used in the VAR line 1102 and ID line 1104. The VAR statement 1102 is used with PROC HPFEVENTS to copy input variables to the output dummy data set. The ID statement 1104 names a numeric variable (e.g., "date" in this example) that identifies observations in the input and output data sets. The "air" variable (which represents airline sales data) is retrieved from the sashelp.air dataset. The events are defined at 1110 and 1112 whose interpretation is shown in FIG. 46.

This example illustrates the behavior of ramp variables when used with the SLOPE=option. This example also shows that when one DURATION=value is finite, and the other is infinite, this is equivalent to extending the finite portion of the event infinitely in one direction. This principle may be understood by examining the results of the following EVENTDEF statements in the code of FIGS. 44 and 45:

```
eventdef monlygg='01Jun1951'D/TYPE=RAMP
    BEFORE=(SLOPE=GROWTH DURATION=4);
eventdef minfgg='01Jun1951'D/TYPE=RAMP
    BEFORE=(SLOPE=GROWTH DURATION=4)
    AFTER=(SLOPE=GROWTH DURATION=ALL);
eventdef minfgd='01Jun1951'D/TYPE=RAMP
    BEFORE=(SLOPE=GROWTH DURATION=4)
    AFTER=(SLOPE=DECAY DURATION=ALL);
```

Figure 48:
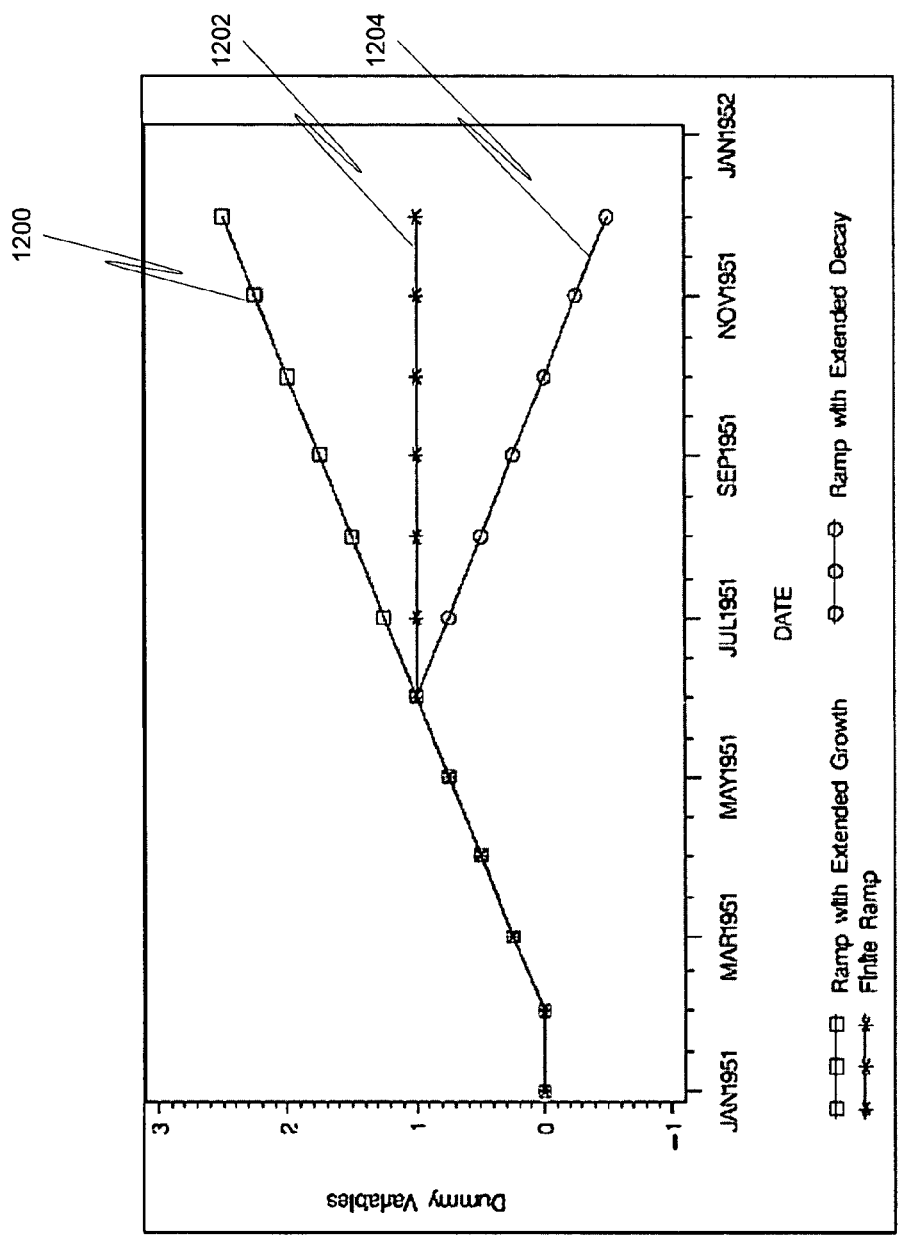
FIG. 48 depicts a plot of finite and extended dummy variables.

These dummy variables can then be viewed using SAS-GRAPH, such as via the code shown in FIG. 47 which produces the graph of FIG. 48. The graph of FIG. 48 is a plot of finite and extended dummy variables. For example, the ramp with extended growth is shown at 1200, the finite ramp is shown at 1202, and the ramp with extended decay is shown at 1204.

It is noted that the systems and methods may be implemented on various types of computer architectures, such as for example on a single general purpose computer or workstation, or on a networked system, or in a client-server configuration, or in an application service provider configuration.

It is further noted that the systems and methods may include data signals conveyed via networks (e.g., local area network, wide area network, internet, etc.), fiber optic medium, carrier waves, wireless networks, etc. for communication with one or more data processing devices. The data signals can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform methods described herein. Other implementations may also be used, however, such as firmware or even appropriately designed hardware configured to carry out the methods and systems described herein.

The systems' and methods' data (e.g., associations, mappings, etc.) may be stored and implemented in one or more different types of computer-implemented ways, such as different types of storage devices and programming constructs (e.g., data stores, RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A computer-implemented method for processing time-series data, comprising:
   accessing, using one or more data processors, time series data including one or more time series;
   accessing, using the one or more data processors, one or more event definitions, wherein each event definition corresponds to an association between an event and a set of one or more parameters;
   generating, using the one or more data processors, one or more dummy variables for a time series, wherein a dummy variable is generated by applying an event to the time series, and wherein an event definition corresponding to the event is used to apply the event to the time series;
   identifying, using the one or more data processors, a model including the event;
   forecasting, using the one or more data processors, the time series, wherein forecasting includes fitting the model to the time series using the event definition corresponding to the event and the one or more dummy variables;
   adjusting, using the one or more data processors, the one or more dummy variables when the time series is altered, wherein adjusting includes applying the event to the altered time series to automatically generate one or more adjusted dummy variables; and
   forecasting, using the one or more data processors, the altered time series, wherein forecasting includes fitting the identified model to the altered time series using the event definition corresponding to the event and the one or more adjusted dummy variables.

2. The method of claim 1, wherein the time series data includes an initial time, an ending time, and a frequency.

3. The method of claim 1, further comprising:
   optimizing one of the one or more parameters associated with the event.

4. The method of claim 2 further comprising:
   selecting the event or an event group based upon the frequency of the time series data.

5. The method of claim 4, wherein the frequency is a seasonal frequency.

6. The method of claim 2, wherein the altered time series includes a different starting time and a different ending time than the time series.

7. The method of claim 1, further comprising:
   adjusting the one or more dummy variables when the event is altered.

8. The method of claim 1, wherein the one or more dummy variables indicate how the event impacts the forecasted time series.

9. The method of claim 1, wherein the set of one or more parameters includes event name parameters, class parameters, key name parameters, timing value parameters, event type parameters, value parameters, shift parameters, pulse parameters, duration parameters, slope parameters, period parameters, controls in an exponential curve, or event combination rules.

10. The method of claim 1, wherein the event is an Easter event, a United States Thanksgiving event, a boxing event, a Christmas event, a father's day event, a Halloween event, a United States Independence day event, a labor day event, a memorial day event, a mother's day event, a new year's day event, a Canadian Thanksgiving day event, or a valentine's day event.

11. The method of claim 1, wherein the time series data is stored in a first data store, and wherein the one or more event definitions are stored in a second separate data store.

12. The method of claim 1, wherein the time series includes an ID statement and one or more time ID values, and wherein the event is also based upon the ID statement and the one or more time ID values.

13. The method of claim 12, wherein the one or more time ID values are defined using a formula.

14. The method of claim 1, wherein the identified model is stored for subsequent use.

15. A system for processing time-series data, comprising:
one or more processors;
one or more computer readable storage mediums containing instructions configured to cause the one or more processors to perform operations including:
accessing time series data including one or more time series;
accessing one or more event definitions, wherein each event definition corresponds to an association between an event and a set of one or more parameters;
generating one or more dummy variables for a time series, wherein a dummy variable is generated by applying an event to the time series, and wherein an event definition corresponding to the event is used to apply the event to the time series;
identifying a model including the event;
forecasting the time series, wherein forecasting includes fitting the model to the time series using the event definition corresponding to the event and the one or more dummy variables;
adjusting the one or more dummy variables in response to an alteration of the time series, wherein adjusting includes applying the event to the altered time series to automatically generate one or more adjusted dummy variables; and
forecasting the altered time series, wherein forecasting includes fitting the identified model to the altered time series using the event definition corresponding to the event and the one or more adjusted dummy variables.

16. A computer program product for processing time-series data, tangibly embodied in a machine readable storage medium, including instructions configured to cause a data processing apparatus to:
access time series data including one or more time series;
access one or more event definitions, wherein each event definition corresponds to an association between an event and a set of one or more parameters;
generate one or more dummy variables for a time series, wherein a dummy variable is generated by applying an event to the time series, and wherein an event definition corresponding to the event is used to apply the event to the time series;
identify a model including the event;
forecast the time series, wherein forecasting includes fitting the model to the time series using the event definition corresponding to the event and the one or more dummy variables;
adjust the one or more dummy variables in response to an alteration of the time series, wherein adjusting includes applying the event to the altered time series to automatically generate one or more adjusted dummy variables; and
forecast the altered time series, wherein forecasting includes fitting the identified model to the altered time series using the event definition corresponding to the event and the one or more adjusted dummy variables.

* * * * *

UNITED STATES PATENT AND TRADEMARK OFFICE
CERTIFICATE OF CORRECTION

| | | |
|---|---|---|
| PATENT NO. | : 8,005,707 B1 | Page 1 of 1 |
| APPLICATION NO. | : 11/431127 | |
| DATED | : August 23, 2011 | |
| INVENTOR(S) | : Jackson et al. | |

It is certified that error appears in the above-identified patent and that said Letters Patent is hereby corrected as shown below:

In column 26, line 33, insert a --,-- after the number 2.

Signed and Sealed this
Twenty-second Day of November, 2011

David J. Kappos
*Director of the United States Patent and Trademark Office*